United States Patent
Beaver et al.

(10) Patent No.: US 9,859,755 B2
(45) Date of Patent: Jan. 2, 2018

(54) DEVICE ALIGNMENT AND IDENTIFICATION IN INDUCTIVE POWER TRANSFER SYSTEMS

(71) Applicant: QUALCOMM, Incorporated, San Diego, CA (US)

(72) Inventors: Jonathan Beaver, Auckland (NZ); Nicholas A. Keeling, Auckland (NZ); Michael Kissin, Auckland (NZ); Edward L. van Boheemen, Auckalnd (NZ)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 13/770,940

(22) Filed: Feb. 19, 2013

(65) Prior Publication Data
US 2014/0015328 A1 Jan. 16, 2014

Related U.S. Application Data

(60) Provisional application No. 61/672,243, filed on Jul. 16, 2012.

(51) Int. Cl.
*H02J 17/00* (2006.01)
*B60L 11/18* (2006.01)
(Continued)

(52) U.S. Cl.
CPC ............ *H02J 17/00* (2013.01); *B60L 11/182* (2013.01); *B60L 11/1829* (2013.01);
(Continued)

(58) Field of Classification Search
CPC ............ B60L 11/1831; B60L 11/1833; B60L 11/182; H02J 5/005; Y02T 10/7005; Y02T 90/127
See application file for complete search history.

(56) References Cited

U.S. PATENT DOCUMENTS 3,771,085 A * 11/1973 Hojo ................ G01C 19/28
336/121
5,821,731 A 10/1998 Kuki et al.
(Continued)

FOREIGN PATENT DOCUMENTS

CN 101764434 A 6/2010
CN 102013717 A 4/2011
(Continued)

OTHER PUBLICATIONS

International Search Report and Written Opinion—PCT/US2013/046858—ISA/EPO—Nov. 22, 2013.
Taiwan Search Report—TW102123701—TIPO—Mar. 12, 2015.

*Primary Examiner* — Thienvu Tran
*Assistant Examiner* — PinPing Sun
(74) *Attorney, Agent, or Firm* — Knobbe, Martens, Olson & Bear, LLP

(57) ABSTRACT

This disclosure provides systems, methods and apparatus for wireless power transfer and particularly wireless power transfer to remote systems such as electric vehicles. In one aspect, a wireless power receiver includes a first inductive element, a power supply, and a communication receiver. The first inductive element is configured to receive wireless power from a first electromagnetic field generated by a wireless power transmitter including a second inductive element. The power supply is configured to supply a current to the first inductive element to generate a second electromagnetic field and induce a current in the second inductive element. The communication receiver is configured to receive an indication of a distance between the first inductive element and the second inductive element based on the induced current in the second inductive element.

38 Claims, 21 Drawing Sheets

(51) Int. Cl.
*H02J 5/00* (2016.01)
*H02J 7/34* (2006.01)

(52) U.S. Cl.
CPC ....... *B60L 11/1831* (2013.01); *B60L 11/1833* (2013.01); *B60L 11/1835* (2013.01); *H02J 5/005* (2013.01); *H02J 7/34* (2013.01); *B60L 2210/30* (2013.01); *B60L 2210/40* (2013.01); *B60L 2230/16* (2013.01); *Y02T 10/7005* (2013.01); *Y02T 10/7088* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 6,492,652 | B2 * | 12/2002 | Muller | G01C 3/085 250/559.29 |
| 6,803,757 | B2 * | 10/2004 | Slates | 324/207.17 |
| 8,106,539 | B2 | 1/2012 | Schatz et al. | |
| 8,248,027 | B2 * | 8/2012 | Sakoda | H02J 5/005 307/104 |
| 2007/0120421 | A1 * | 5/2007 | Boys | 307/11 |
| 2010/0017249 | A1 * | 1/2010 | Fincham | B60L 3/12 705/412 |
| 2010/0117586 | A1 * | 5/2010 | Akiyama | 318/801 |
| 2010/0117596 | A1 | 5/2010 | Cook et al. | |
| 2010/0148723 | A1 * | 6/2010 | Cook et al. | 320/108 |
| 2010/0161217 | A1 | 6/2010 | Yamamoto | |
| 2010/0235006 | A1 | 9/2010 | Brown | |
| 2011/0049978 | A1 * | 3/2011 | Sasaki | H01F 38/14 307/9.1 |
| 2011/0062793 | A1 | 3/2011 | Azancot et al. | |
| 2011/0181238 | A1 | 7/2011 | Soar | |
| 2011/0204845 | A1 | 8/2011 | Paparo et al. | |
| 2011/0254377 | A1 * | 10/2011 | Wildmer et al. | 307/104 |
| 2011/0254503 | A1 | 10/2011 | Widmer et al. | |
| 2011/0278942 | A1 | 11/2011 | Eckhoff et al. | |
| 2012/0056616 | A1 * | 3/2012 | May | F16F 9/04 324/207.15 |
| 2012/0091959 | A1 | 4/2012 | Martin et al. | |
| 2012/0193993 | A1 | 8/2012 | Azancot et al. | |
| 2012/0235506 | A1 | 9/2012 | Kallal et al. | |
| 2012/0248890 | A1 * | 10/2012 | Fukushima | H02J 5/005 307/104 |
| 2012/0262002 | A1 | 10/2012 | Widmer et al. | |

FOREIGN PATENT DOCUMENTS

| | | | |
|---|---|---|---|
| CN | 102106054 A | 6/2011 | |
| EP | 1061631 A1 | 12/2000 | |
| EP | 2199142 A1 * | 6/2010 | ............ B60W 10/26 |
| EP | 2199142 A1 | 6/2010 | |
| JP | 2006345588 A | 12/2006 | |
| JP | 2010183813 A | 8/2010 | |
| JP | 2011160515 A | 8/2011 | |
| TW | 591847 B | 6/2004 | |
| TW | 201041267 A | 11/2010 | |
| WO | WO-2008114268 A2 | 9/2008 | |
| WO | 2009116025 A2 | 9/2009 | |
| WO | 2011116394 A1 | 9/2011 | |
| WO | WO 2011116394 A1 * | 9/2011 | ................ H02J 7/00 |
| WO | WO-2011125632 A1 | 10/2011 | |
| WO | WO-2012086048 A1 | 6/2012 | |

* cited by examiner

DEVICE ALIGNMENT AND IDENTIFICATION IN INDUCTIVE POWER TRANSFER SYSTEMS

CROSS REFERENCE TO RELATED APPLICATIONS

This application claims benefit under 35 U.S.C. §119(e) to U.S. Provisional Patent Application No. 61/672,243 entitled "DEVICE ALIGNMENT AND IDENTIFICATION IN INDUCTIVE POWER TRANSFER SYSTEMS" filed on Jul. 16, 2012; the disclosure of which is hereby incorporated by reference in its entirety.

FIELD

The present disclosure relates generally to wireless power transfer, and more specifically to devices, systems, and methods for wireless power transfer to remote systems, such as vehicles including batteries, and for aligning and identifying wireless power transfer devices.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device transmits power to a secondary (or "pick-up") power receiver device. Each of the transmitter and receiver power devices include inductors, typically coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power receiver that includes a first inductive element, a power supply, and a communication receiver. The first inductive element is configured to receive wireless power from a first electromagnetic field generated by a wireless power transmitter comprising a second inductive element. The power supply is configured to supply a current to the first inductive element to generate a second electromagnetic field and induce a current in the second inductive element. The communication receiver is configured to receive an indication of a distance between the first inductive element and the second inductive element based on the induced current in the second inductive element.

In another aspect, the disclosure provides a wireless power transmitter that includes a first inductive element, a detector, and a communication transmitter. The first inductive element is configured to generate a first electromagnetic field for transferring wireless power to a wireless power receiver comprising a second inductive element. The detector is configured to detect an induced current in the first inductive element and determine an indication of a distance between the first inductive element and the second inductive element based on the induced current. The induced current is induced in the first inductive element by a second electromagnetic field generated by a current in the second inductive element. The communication transmitter is configured to transmit the indication to the wireless power receiver.

In a further aspect, the disclosure provides a method of operating a wireless power receiver. The method includes: supplying a current to a first inductive element to generate an electromagnetic field and induce a current in a second inductive element; and receiving an indication of a distance between the first inductive element and the second inductive element based on the induced current in the second inductive element.

In yet another aspect, the disclosure provides a method of operating a wireless power transmitter. The method includes: detecting an induced current in a first inductive element, the induced current induced in the first inductive element by an electromagnetic field generated by a current in a second inductive element, a wireless power receiver comprising the second inductive element; determining an indication of a distance between the first inductive element and the second inductive element based on the induced current; and transmitting the indication to the wireless power receiver.

In another aspect, the disclosure provides a wireless power receiver comprising: means for receiving wireless power from a first electromagnetic field generated by a wireless power transmitter comprising a second inductive element; means for supplying a current to the means for receiving wireless power from the first electromagnetic field to generate a second electromagnetic field and induce a current in the second inductive element; and means for receiving an indication of a distance between the first inductive element and the second inductive element based on the induced current in the second inductive element.

In a further aspect, the disclosure provides a wireless power transmitter comprising: means for generating a first electromagnetic field for transferring wireless power to a wireless power receiver comprising a second inductive element; means for detecting an induced current in the means for generating the first electromagnetic field, the induced current induced in the means for generating the first electromagnetic field by a second electromagnetic field generated by a current in the second inductive element; means for determining an indication of a distance between the means for generating the first electromagnetic field and the second inductive element based on the induced current; and means for transmitting the indication to the wireless power receiver.

In another aspect, the disclosure provides a non-transitory, computer-readable medium comprising instructions that when executed cause a processor to perform a method of: supplying a current to a first inductive element to generate a first electromagnetic field and induce a current in a second inductive element; receiving an indication of a distance between the first inductive element and the second inductive element based on the induced current in the second inductive element; and receiving with the first inductive element wireless power from a second electromagnetic field generated by the second inductive element.

In a further aspect, the disclosure provides a non-transitory, computer-readable medium comprising instructions that when executed cause a processor to perform a method of: detecting an induced current in a first inductive element, the induced current induced in the first inductive element by a first electromagnetic field generated by a current in a second inductive element, a wireless power receiver comprising the second inductive element; determining an indication of a distance between the first inductive element and the second inductive element based on the induced current; transmitting the indication to the wireless power receiver; and generating a second electromagnetic field for transferring wireless power to the second inductive element.

In yet another aspect, the disclosure provides a wireless power receiver comprising a first inductive element and a power supply. The first inductive element is configured to receive wireless power from a first electromagnetic field generated by a wireless power transmitter comprising a second inductive element. The power supply is configured to supply a current to the first inductive element to generate a second electromagnetic field to induce a current in the second inductive element so that the wireless power transmitter determines that the wireless power receiver is in a position suitable for receiving wireless power from the wireless power transmitter, and selectively receive power from or provide power to the first inductive element.

Figure 1:
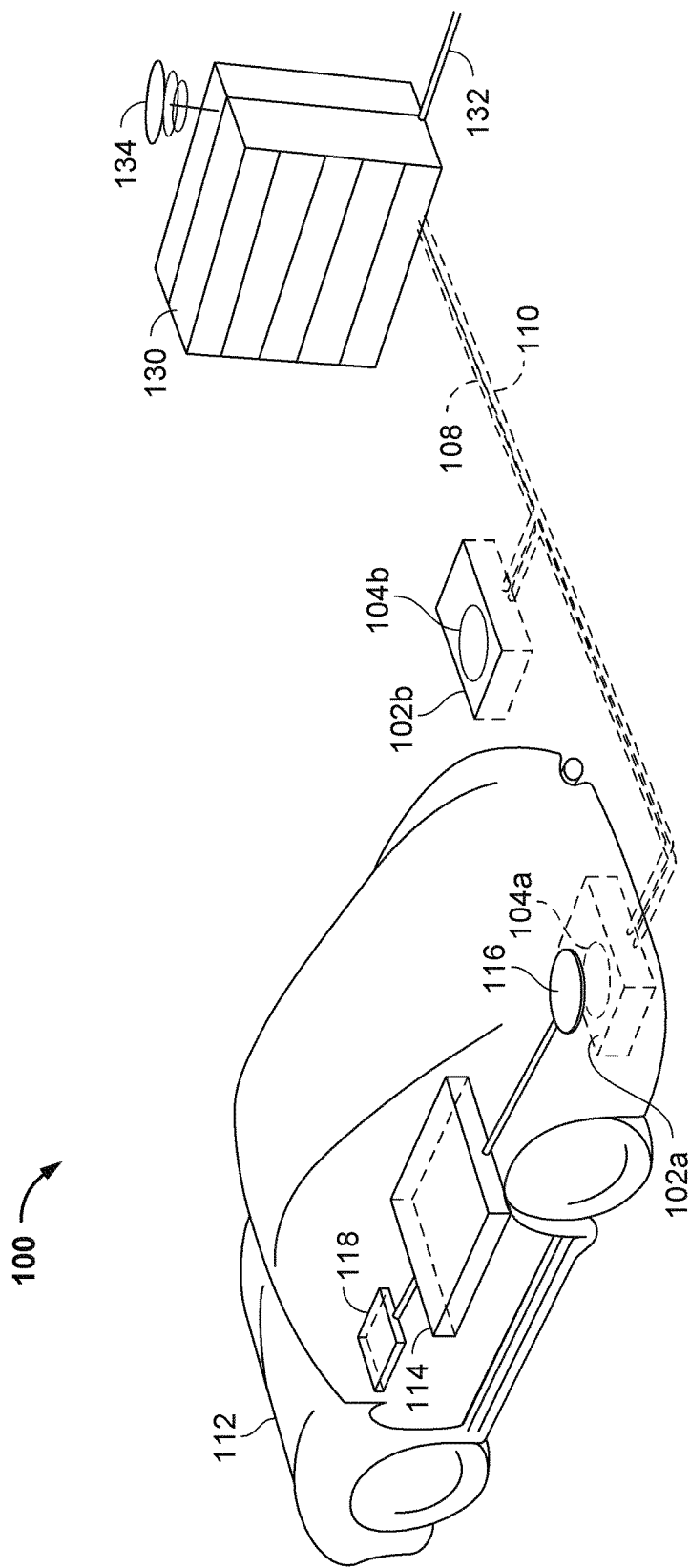
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. The exemplary embodiments of the invention may be practiced without these specific details. In some instances, well-known structures and devices are shown in block diagram form in order to avoid obscuring the novelty of the exemplary embodiments presented herein.

Inductive power transfer (IPT) systems may transfer power optimally when the primary and secondary inductors are aligned. It is therefore desirable for an electric vehicle wireless power charging system to include a system for ensuring the vehicle is positioned to optimize alignment of the inductors prior to the start of charging.

As well as sub-optimal power transfer, there may be a safety risk if a primary inductor is energized for charging before the secondary inductor is correctly aligned. For example, an electric vehicle charging system may include ground-mounted power devices in which the primary inductor is housed that are easily accessible to bystanders and may be open for debris or the like to rest on or nearby the device. There may be a risk, be it perceived or real, to humans or animals from exposure to electromagnetic fields. Also, some types of materials resting on a wireless power transfer base device may be vulnerable to ignition. If a vehicle without a pick-up power device is positioned over an energized primary device, heating of parts of the vehicle may occur, which could be hazardous. As a result, some countries or regions may impose safety standards with which electric vehicle charging systems are legally required to comply. It is therefore desirable to minimize any such risks with wireless power transfer systems without significant expense and complexity.

Base charging devices may be equipped with sensors for detecting the presence of debris or moving objects near the device and refrain from energizing when a positive detection is made. However, in some instances, sensors are prone to error and involve the cost and complexity of additional componentry.

Electric vehicle IPT systems may use a variety of alignment systems to align the electric vehicle and charging device inductors and then to communicate that alignment has been achieved to the charging device, thus enabling it to safely energize. For example, alignment systems may include mechanical guides, sensors or wireless communication links (e.g. RF communication, Bluetooth, etc) that provide feedback to a driver or vehicle guidance system. Once adequate alignment is achieved, a signal is sent back to the charging device, which is then able to safely energize. However, in some instances, such alignment mechanisms add complexity and cost to a wireless power transfer system because of the need for additional componentry for the alignment systems.

Similar systems may be used to select which of multiple charging devices to energize in a situation where a vehicle has a choice of charging devices from which to receive power, for example, in a parking lot with charging devices in each parking space. Accurately ascertaining the position of a vehicle may be used to select the correct charging device to energize, which may be difficult to do using some communication devices in some instances.

Wireless power transfer systems may use a wireless power link to communicate between the transmitter and receiver devices without additional specific communications antennae. For example, a controller may enable amplitude shift keying on the wireless power path at predefined intervals, which may be detected by a receiver device. The base device may include a load sensing circuit which is affected by the presence of a receiver device, thus detecting it. However, in some instances, such systems involve periodic energizing of the charging device to some degree even when an electric vehicle is not present, which may be undesirable from a safety perspective.

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless power charging system 102a. Spaces for two electric vehicles are illustrated in a parking area to be parked over corresponding base wireless power charging system 102a and 102b. In some embodiments, a local distribution center 130 may be connected to a power backbone 132 and configured to provide an alternating current (AC) or a direct current (DC) supply through a power link 110 to the base wireless power charging system 102a. The base wireless power charging system 102a also includes a base system induction coil 104a for wirelessly transferring or receiving power. An electric vehicle 112 may include a battery unit 118, an electric vehicle induction coil 116, and an electric vehicle charging system 114. The electric vehicle induction coil 116 may interact with the base system induction coil 104a, for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases, the near-field may correspond to a region that is within about $\frac{1}{2}\pi$ of wavelength of the base system induction coil 104a (and vice versa for the electric vehicle induction coil 116).

Local distribution 130 may be configured to communicate with external sources (e.g., a power grid) via a communication backhaul 134, and with the base wireless power charging system 102a via a communication link 108.

In some embodiments, the electric vehicle induction coil 116 may be aligned with the base system induction coil 104a and, therefore, disposed within a near-field region simply by the driver positioning the electric vehicle 112 correctly relative to the base system induction coil 104a. Additionally or alternatively, the driver may be given visual feedback, auditory feedback, or combinations thereof to determine when the electric vehicle 112 is properly placed for wireless power transfer. Additionally or alternatively, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without driver intervention or with minimal driver intervention if, for instance, the electric vehicle 112 is equipped with a servo steering wheel, ultrasonic sensors, and intelligence to adjust the vehicle. Additionally or alternatively, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless power charging system 102a may be located in a variety of locations. As examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless power charging system 102a transfers power to the electric vehicle 112 and the electric vehicle 112 transfers power to the base wireless power charging system 102a, for example, in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
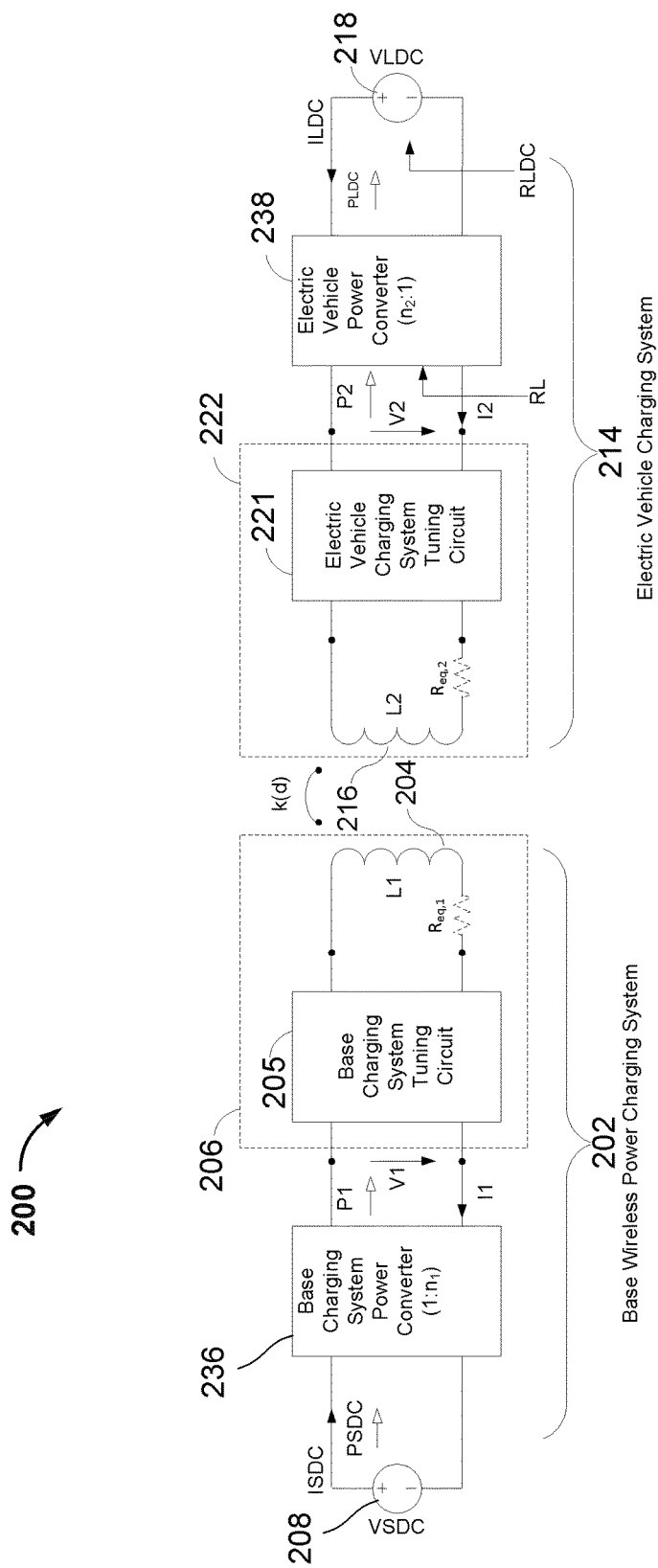
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204). As shown in FIG. 2, inductance may generally be the inductance of the induction coil, whereas, capacitance may be added to the induction coil to create a resonant structure at a desired resonant frequency. As an example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another example, a capacitor may be placed in parallel between the two terminals of the induction coil (e.g., a parallel resonant circuit). Furthermore, an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle charging system 214 of an electric vehicle 112, but is not limited thereto. For example, the electric vehicle 112 may transfer power to the base wireless power charging system 202.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ may be provided to form a resonant circuit with the base system induction coil 204 that resonates at a desired frequency.

Both the base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221, respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, for example, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed in this disclosure. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless power charging system 202 (acting as a transmitter), which may be used to decouple the electric vehicle charging system 214 (acting as the receiver) from the base wireless power charging system 202. The load changes may be detected if the transmitter includes the load sensing circuit. Accordingly, the transmitter, such as a base wireless power charging system 202, may have a mechanism for determining when receivers, such as an electric vehicle charging system 214, are present in the near-field of the base system induction coil 204.

In operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle charging system 214 or the electric vehicle battery unit 218 of the electric vehicle 112. As described above, in some embodiments, the base system induction coil 204 and electric vehicle induction coil 216 are configured according to a mutual resonant relationship such that when the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

An efficient energy transfer may occur by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur may be referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge one or more batteries.

The electric vehicle induction coil 216 and base system induction coil 204 may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

Efficient transfer of energy between a transmitter and receiver may occur during matched or nearly matched resonance between a transmitter and a receiver. Further, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

According to some embodiments, coupling power between two induction coils that are in the near field of one another is disclosed. The near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 4:
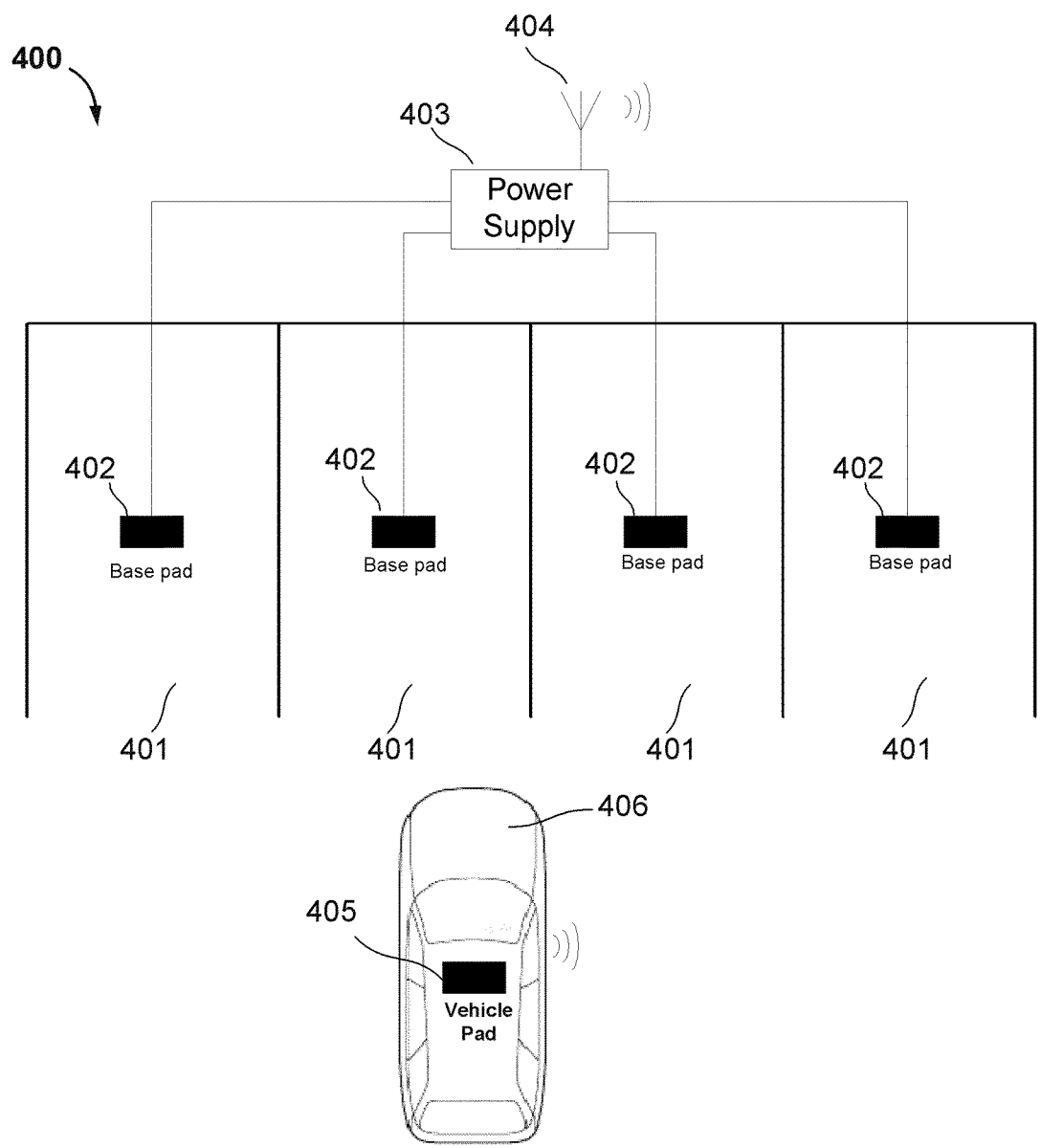
FIG. 4 is a diagram of a wireless power transfer system in accordance with an exemplary embodiment.
Figure 5:
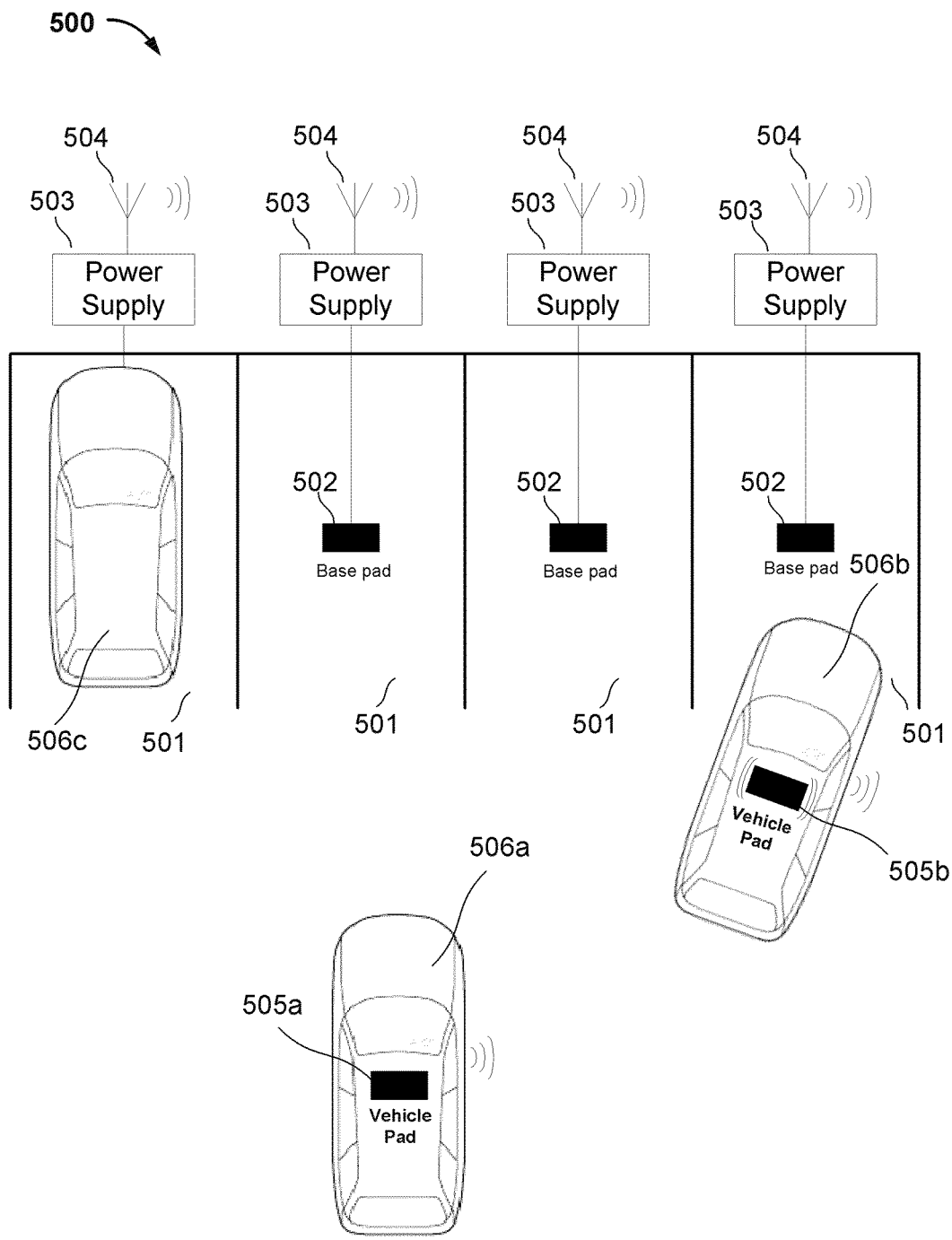
FIG. 5 is a diagram of another wireless power transfer system in accordance with an exemplary embodiment.

FIG. 4 and FIG. 5 are diagrams of wireless power transfer systems 400 and 500, respectively, in accordance with exemplary embodiments. In FIG. 4, a plurality of car parking spaces 401 each have wireless power transfer transmitter devices 402 associated with them, for example, mounted on the ground inside the parking space. The transmitter devices 402 are connected to a single power supply 403, which is coupled to communication means 404. The transmitter devices 402 are suitable for charging a wireless power transfer receiver device 405 associated with an electric vehicle 406, for example, by the electric vehicle 406 driving into one of the parking spaces 401 to align the inductors of the transmitter and receiver devices such that power can be transferred by inductive power transfer.

In the system shown in FIG. 5, each car parking space 501 has a wireless power transfer transmitter device 502 associated with it and each transmitter device 502 is connected to its own power supply 503, each of which is coupled to a communication means 504.

Operation of the wireless power transfer systems shown in FIGS. 4 and 5 will now be described with reference to FIGS. 6A and 6B, which are flowcharts illustrating a methods 600 and 610, respectively, of operating a wireless power transfer system according to exemplary embodiments. It will be understood that the methods 600 and 610 comprise methods of operating the wireless power transfer receiver and transmitter devices.

Figure 6A:
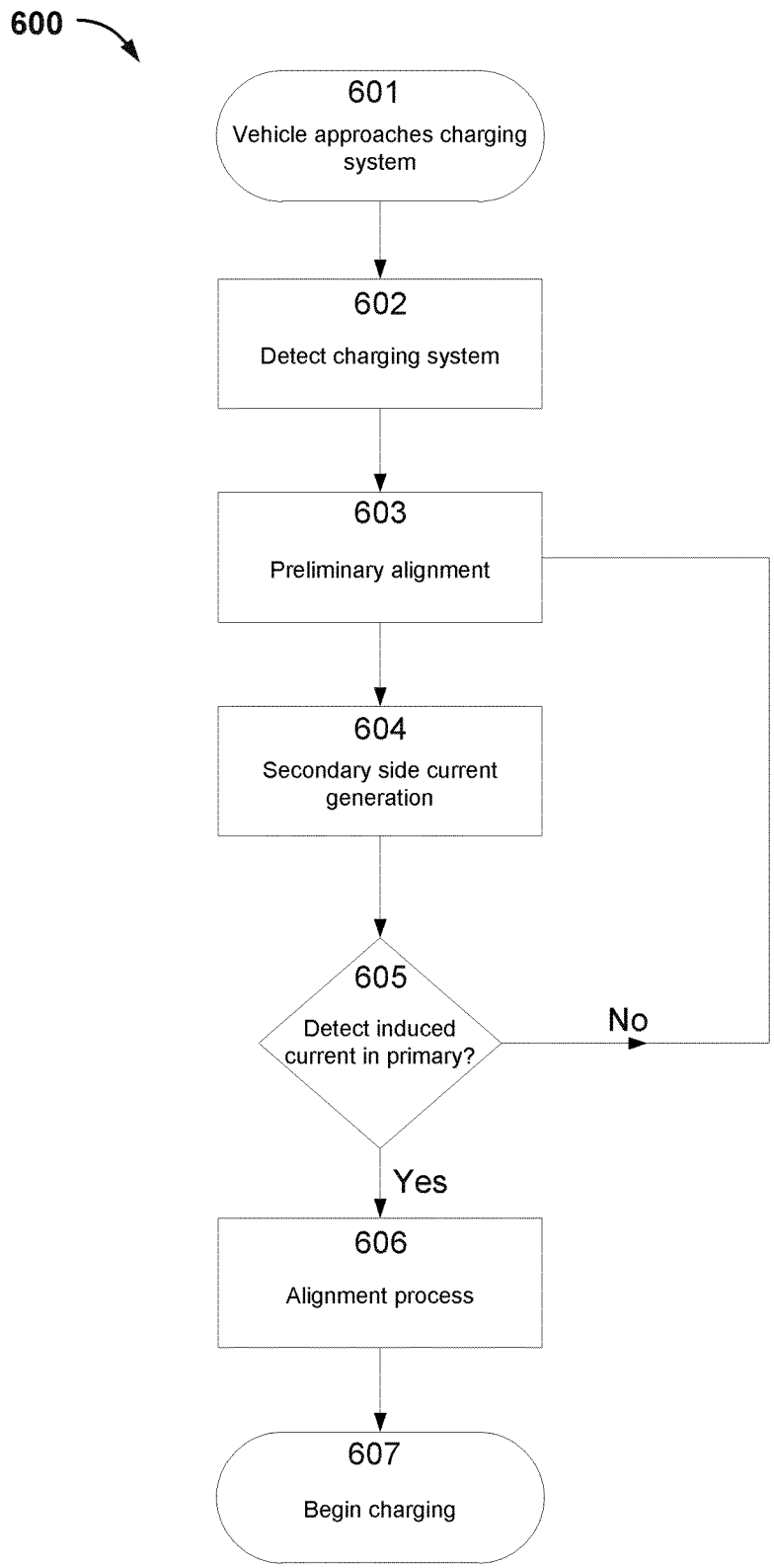
FIG. 6A is a flowchart illustrating a method of operating a wireless power transfer system according to an exemplary embodiment.

In the method 600 of FIG. 6A, at block 601, an electric vehicle 406 or 506a approaches the charging apparatus of the wireless power transfer system 400 or 500, respectively. At block 602, the electric vehicle or its driver may detect the presence of the charging apparatus. The driver may see a visual indicator that the charging apparatus is present in parking spaces 401 or 501, for example, a sign or the sight of power transmitter device 402 or 502 lying on the ground. Additionally or alternatively, wireless communications may inform the vehicle 406 or 506a of the presence of the charging system. Such wireless communications may involve determining any one or more of: location, for example using GPS; signal strength of a signal from the power supply communications device 404 or 504, or any other such method determining proximity. In one example, the vehicle 406 or 506a may be able to wirelessly communicate with the power supply communication means 404 or 504 or alternatively with other communication systems associated with the transmitter devices 402 or 502. Any appropriate means of communication may be used, for example RF communication, Bluetooth, zigbee, cellular and the like.

When a charging system is detected, the receiver device 405 or 505a may be energized, for example, as in the case of receiver device 505a of vehicle 506b shown in FIG. 5. Appropriate constraints may be placed on allowing the receiver device to energize, as well as detection of an appropriate charging system. For example, speed of the vehicle, proximity to charging system, or user intervention may govern the energizing of a vehicle IPT device to increase safety and reduce the potentially negative effects that could be caused by energized IPT devices in dangerous situations. If detected via automated means, the vehicle may indicate the presence of the charging system to the driver, for example, by an appropriate visual or audio message or indicator.

At block 603, the receiver device 405 or 505a is moved into preliminary alignment with the transmitter device 402 or 502 of one of the parking spaces, which the driver may be at liberty to select. This step may involve the driver driving the vehicle 406 or 506b into the selected driving space. The driver may use visual or physical alignment guides for coarse alignment, for example, markings associated with the parking space 401 or 501, wheel guides, or the like. Additionally or alternatively, the vehicle 406 or 506a may comprise an alignment system for automatically aligning the vehicle. By the end of the preliminary alignment at block 603, the vehicle 406 or 506a may be positioned generally over transmitter device 402 or 502 such that access to the transmitter device is restricted because of the vehicle.

At block 604, the receiver device 405 or 505a is energized if it has not already been. An alternating current is generated in the secondary inductor of the wireless power transfer receiver device 405 or 505a. The current is generated by a power supply on the secondary or receiver side of the system, for example, by a power supply on board the vehicle 406 or 506a.

If the step of preliminary alignment was performed sufficiently at block 603 to enable inductive power transfer between the transmitter device 402 or 502 and receiver device 405 or 505a, the alternating current in the secondary inductor of the receiver device 405 or 505a induces a current in the primary inductor of the transmitter device 402 or 502.

It will be understood that the terms "transmitter", "receiver", "primary" and "secondary" and the like are used herein to refer to the normal uses of the components of the wireless power transfer system when used for transferring power from the power supply to the electric vehicle, for example, from the transmitter or primary device to the receiver or secondary device. However, the disclosure describes the use of these components to transfer some power, which, in some embodiments, may be a small amount, in the opposite direction as part of a process to improve alignment of the transmitter and receiver devices, or to identify which transmitter device is appropriately placed for transferring power to the receiver device, for example. Therefore, the "transmitter" may also be used to receive power and the "receiver" may also be used to transmit power. The use of these terms, although referring to the normal sense of operation of certain components of the system for ease of understanding, does not limit the embodiments to any particular operation of such components.

Following generation of a current in the inductor of the receiver device 405 or 505a, a current will be induced in the inductor of the transmitter device 402 or 502 if the inductors are suitably close together. If no induced current is detected in the transmitter inductor at block 605, the preliminary alignment at block 603 may be again performed. For example, the driver may be informed to adjust the alignment or an alignment system may be automatically activated to attempt preliminary alignment again. If an induced current is detected in the transmitter inductor at block 605, then this indicates that the inductors are in a position suitable for wireless power transfer between them.

At block 606, the wireless power transfer system may perform fine tuning of the alignment between the two inductors. This may be an automatic process, and an example of a system able to automate alignment is described with respect to FIG. 3. This step may be completed once alignment has been optimized, and an alignment threshold has been reached or a threshold coupling level between the primary and secondary inductors has been reached, for example. Optimizing alignment between the two inductors may be desirable to optimize the efficiency of the transfer of power to the electric vehicle from the power supply. In some embodiments, the further alignment process at block 606 may not be performed.

At block 607, the supply of power from the power supply to the electric vehicle is initiated. In this step, the electric vehicle 406 or 506a is charged using the normal charging operation of the wireless power transfer system.

It can be seen that method described herein may allow wireless power transfer to operate safely and efficiently in wireless power transfer systems, including a system such as is shown in FIG. 4 involving one power supply 403 serving a plurality of transmitter devices 402, or a system such as is shown in FIG. 5 involving a power supply 503 per transmitter device 502.

In the wireless power transfer systems shown in FIG. 4 and FIG. 5, power may be supplied to the power transmitter devices 402 or 502 when a power receiver device 405 or 505a is in a position suitable for power to be transferred wirelessly between the devices. Such a position may involve a vehicle being positioned over the transmitter device, thus reducing or eliminating the chances of pedestrians or animals going near the transmitter device and being exposed to potentially harmful electromagnetic fields.

The exemplary method 600 may allow a driver of a vehicle to select whichever parking space they prefer to park in, and the system may energize the transmitter device in the selected parking space. In some systems, a driver may either be told which parking space to park in (for instance, because that is the space associated with the transmitter device that will be energized) or a number of transmitter devices may be energized to determine which parking space has been selected.

Another benefit of the exemplary method 600 may be that alignment and transmitter device detection/selection may be performed without use of additional alignment systems other than the power transfer apparatus itself. Furthermore, multiple vehicles can be aligned at once without the use of additional alignment systems, such as GPS or RFID, which may add to the cost or complexity of the system and may be inaccurate in some cases.

Yet another benefit of not energizing a transmitter device until a receiver device is located appropriately in relation to it is that non-IPT vehicles may be able to park near transmitter devices without the risk of localized heating caused by magnetic fields acting on parts of the vehicle body. Similar risks caused by an electric vehicle parking incorrectly on a transmitter device are also reduced.

In some embodiments, particularly systems in which multiple vehicles may align with charging devices simultaneously, it may be beneficial for a system to be able to identify which vehicle is approaching or associated with which charging device. To this end, a controller may be operable to control the generation of current on the receiver-side. For example, the generated current may be modulated, interrupted or otherwise modified in some way. In turn, the induced current in the transmitter device will reflect the modification and allow the system to identify which receiver device is inductively coupled to which transmitter device. Each receiver device may modify the current in a unique manner, for example, using a unique modulation signature. This may allow the power supply to each of a number of charging devices to be controlled correctly based on the requirements of the vehicles that they are associated with.

Figure 6B:
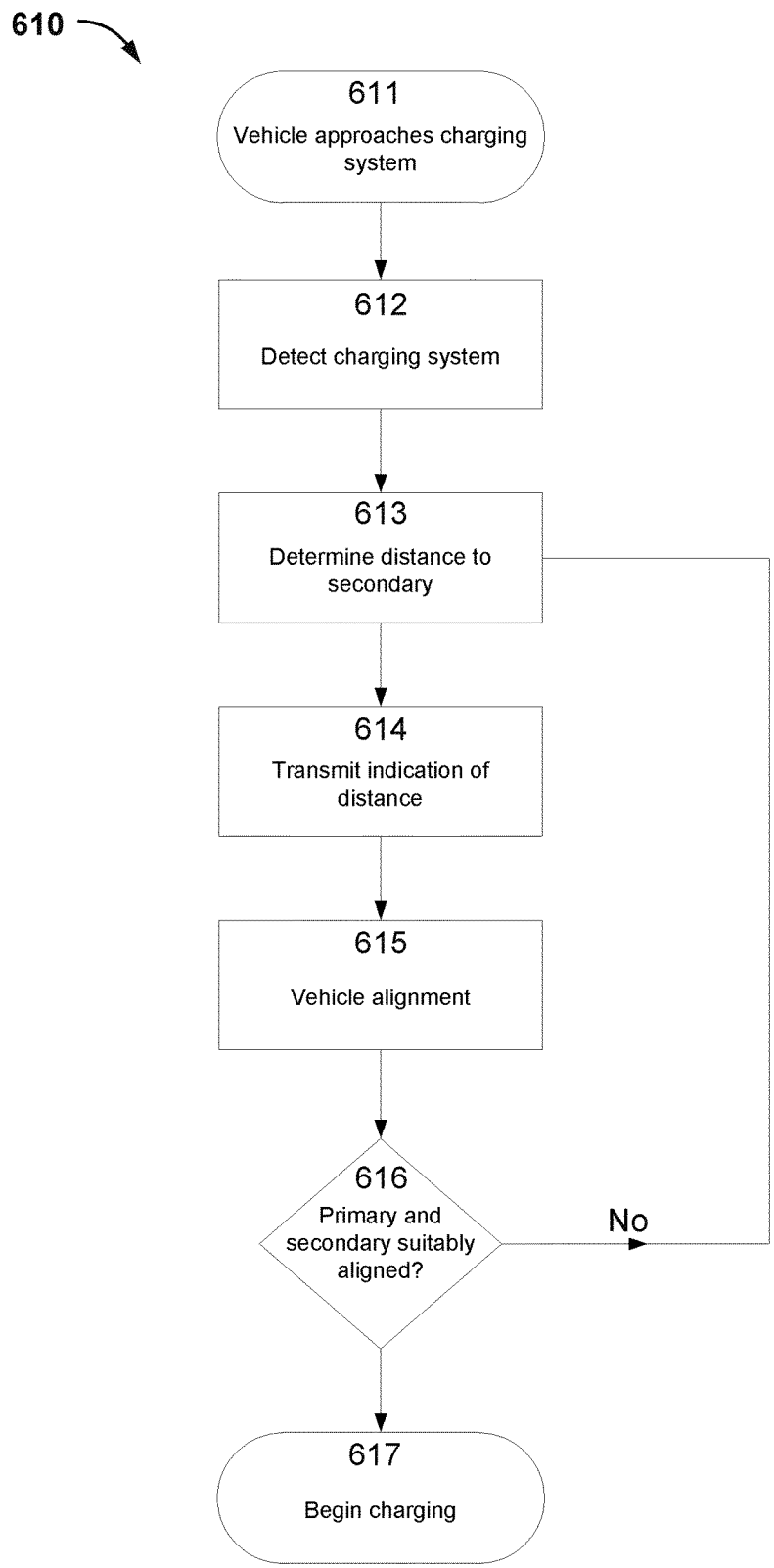
FIG. 6B is a flowchart illustrating a method of operating a wireless power transfer system according to an exemplary embodiment.

In the method 610 of FIG. 6B, at block 611, an electric vehicle 406 or 506a approaches the charging apparatus of the wireless power transfer system 400 or 500, respectively. At block 612, the vehicle 406 or 506a or its driver may detect the presence of the charging apparatus. The driver may see a visual indicator that the charging apparatus is present in parking spaces 401 or 501, for example, a sign or the sight of power transmitter device 402 or 502 lying on the ground. Additionally or alternatively, wireless communications may inform the vehicle 406 or 506a of the presence of the charging system. Such wireless communications may involve determining any one or more of: location, for example using GPS; signal strength of a signal from the power supply communications device 404 or 504, or any other such method determining proximity. In one example, the vehicle 406 or 506a may be able to wirelessly communicate with the power supply communication means 404 or 504 or alternatively with other communication systems associated with the transmitter devices 402 or 502. Any appropriate means of communication may be used, for example RF communication, Bluetooth, zigbee, cellular and the like.

When a charging system is detected, a current may be generated in the secondary inductor of the receiver device 405 or 505a. In some aspects, the vehicle 406 or 506a may notify the transmitter devices 402 or 502, such as via the power supply communication means 404 or 504, that the vehicle 406 or 506a intends to energize the secondary inductor of the receiver device 405 or 505a before the secondary inductor is energized.

Following generation of the current in the inductor of the receiver device 405 or 505a, a current may be induced in the inductor of a transmitter device 402 or 502 if the secondary inductor of the receiver device 405 or 505a is suitably close to the primary inductor of the transmitter device 402 or 502. At block 613, the transmitter device 402 or 502 may determine the distance of the secondary inductor relative to the primary inductor. The transmitter device 402 or 502, for instance, may measure the magnitude of the induced current in the primary inductor to determine an indication of the distance between the secondary inductor and the primary inductor. The indication may be a value indicative of the magnitude of the induced current such as a current measurement in amperes or an amount or percentage of current relative to a threshold current. On the other hand, if no induced current is detected or the detected current is below a minimum current level, the transmitter device 402 or 502 may inform the driver to adjust the alignment or an alignment system may be automatically activated to attempt closer positioning before determining the position of the secondary inductor relative to the primary inductor.

At block 614, the transmitter device 402 or 502 may transmit the indication of the distance between the secondary inductor and the primary inductor to the receiver device 405 or 505a or other device or structure near a parking space. At block 615, the driver or alignment system may adjust the position of the vehicle 406 or 506a based on the indication to more closely align the receiver device 405 or 505a with the transmitter device 402 or 502 and, in particular, may align the secondary inductor with the primary inductor. The vehicle 406 or 506a or other device or structure near the parking space may further include a display, such as one or more lights or display screens, to facilitate display of information based on the indication to the driver. The display may communicate a direction of travel for the vehicle 406 or 506a, such as to proceed left, right, or forward, and the like, to assist with aligning the receiver device 405 or 505a with the transmitter device 402 or 502. In some aspects, the display may be a graphical user interface included in the vehicle 406 or 506a used for performing or assisting other functions of the vehicle 406 or 506a.

At block 616, the transmitter device 402 or 502 may determine whether the secondary inductor and primary inductor are suitably aligned. If the inductors are not suitably aligned, the method 610 moves to block 613, and the transmitter device 402 or 502 may again determine the distance of the secondary inductor relative to the primary inductor. Since the secondary inductor may have moved because the receiver device 405 or 505a of the vehicle 406 or 506a may have moved, the determined distance may be updated from the previous distance determination. At block 614, an indication of the updated distance may be transmitted to the receiver device 405 or 505a or other device or structure near the parking space. At block 615, the driver or alignment system may adjust the position of the vehicle 406 or 506a based on the updated indication. Accordingly, the transmitter device 402 or 502 may continuously determine an indication of the distance between the secondary inductor and primary inductor and transmit the indication to the receiver device 405 or 505a or other device or structure near the parking space. The receiver device 405 or 505a or other device or structure near the parking space may, in turn, continuously receive the indication, and the alignment of the vehicle 406 or 506a may be adjusted so that the receiver device 405 or 505a and the transmitter device 402 or 502 are more closely aligned.

Alternatively, at block 616, if the inductors are suitably aligned, the method 610 moves to block 617, and the supply of power from the power supply of the transmitter device 402 or 502 to the vehicle 406 or 506a is initiated. In this step, the vehicle 406 or 506a is charged using the normal charging operation of the wireless power transfer system.

In some aspects, one or more transmitter devices 402 or 502 may be used to perform one or more blocks of method 610, such as blocks 613 or 616. For example, at block 613, two transmitter devices 402 or 502 of the wireless power transfer systems 400 or 500 may be used to determine two distances to the vehicle 406 or 506a for assisting in the vehicle alignment at block 615. Further, in some aspects, the method 610 may advantageously enable the receiver device 405 or 505a not to directly determine or measure its distance or position relative to the transmitter device 402 or 502, and rather indirectly determine its distance or position via communications with the transmitter device 402 or 502. Alternatively, the method 610 may advantageously enable the receiver device 405 or 505a to receive supplemental distance or position information from the transmitter device 402 or 502 to assist with aligning the receiver device 405 or 505a with the transmitter device 402 or 502.

Exemplary components will now be discussed of a wireless power transfer system in which alignment of the transmitter and receiver inductors may be performed automatically.

Figure 3:
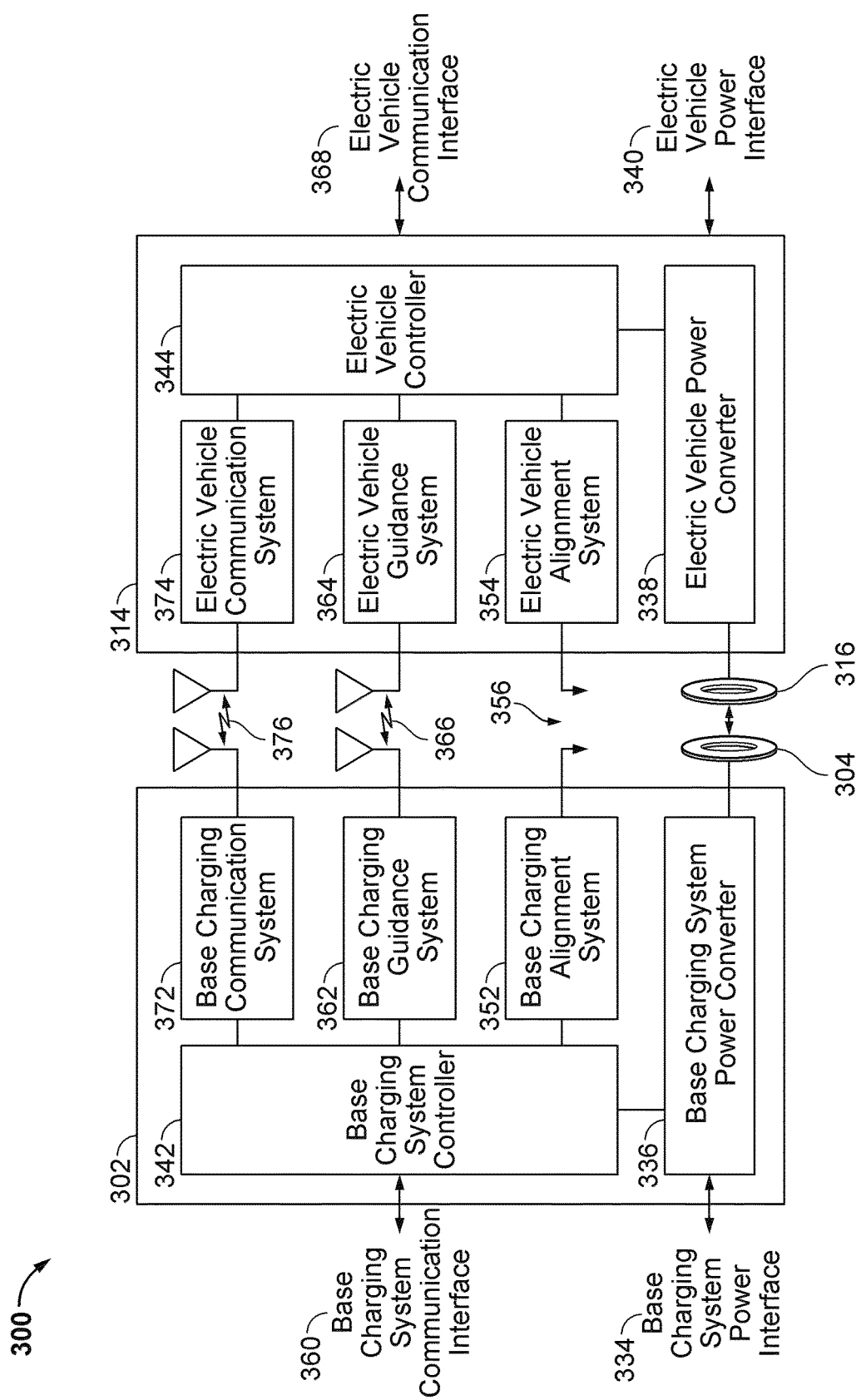
FIG. 3 is another functional block diagram showing exemplary core and ancillary components of the wireless power transfer system of FIG. 1.

FIG. 3 is a functional block diagram showing exemplary core and ancillary components of the wireless power transfer system 100 of FIG. 1. The wireless power transfer system 300 illustrates a communication link 376, a guidance link 366, and alignment systems 352, 354 for the base system or transmitter inductor 304 and electric vehicle or receiver inductor 316. As described above with reference to FIG. 2, and with reference to the use of the system when energy flow is towards an electric vehicle, in FIG. 3 a base charging system power interface 334 may be configured to provide power to a charging system power converter 336 from a power source, such as an AC or DC power supply. The base charging system power converter 336 may receive AC or DC power from the base charging system power interface 334 to excite the base system induction coil 304 at or near its resonant frequency. The electric vehicle inductor 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface 340.

The base wireless power charging system 302 includes a base charging system controller 342 and the electric vehicle charging system 314 includes an electric vehicle controller 344. The base charging system controller 342 may include a base charging system communication interface 360 to other systems such as, for example, a computer, and a power distribution center, or a smart power grid. The electric vehicle controller 344 may include an electric vehicle communication interface 368 to other systems such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As examples, a base charging alignment system 352 may communicate with an electric vehicle alignment system 354 through an alignment link 356 to provide a feedback mechanism for more closely aligning the base system induction coil 304 and electric vehicle induction coil 316, autonomously and/or with operator assistance. Similarly, a base charging guidance system 362 may communicate with an electric vehicle guidance system 364 through a guidance link 366 to provide a feedback mechanism to guide the electric vehicle autonomously and/or with operator assistance in aligning the base system induction coil 304 and electric vehicle induction coil 316. Further, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for an electric vehicle. These communication channels may be separate physical communication channels such as, for example, Bluetooth, zigbee, cellular, and the like.

Electric vehicle controller 344 may also include a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in the base wireless power charging system 302 and the electric vehicle charging system 314. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, and the like), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power transmitter/receiver devices 304, 316 beyond a safety radius, detection of metal objects near the base system induction coil 304 that may be heated up (for example, due to induction heating), detection of hazardous events such as incandescent objects on the base system inductor 304, and temperature monitoring of the base wireless power charging system 302 and electric vehicle charging system 314 components.

To communicate between a base wireless power charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power inductors 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 304. Detection of changes to the loading on the power amplifier may be monitored by the base charging system controller 342 for use in determining whether to enable the oscillator for transmitting energy, to communicate with an active receiver, or a combination thereof.

A number of exemplary circuits will now be described suitable for use in wireless power transfer systems according to exemplary embodiments.

Figure 7:
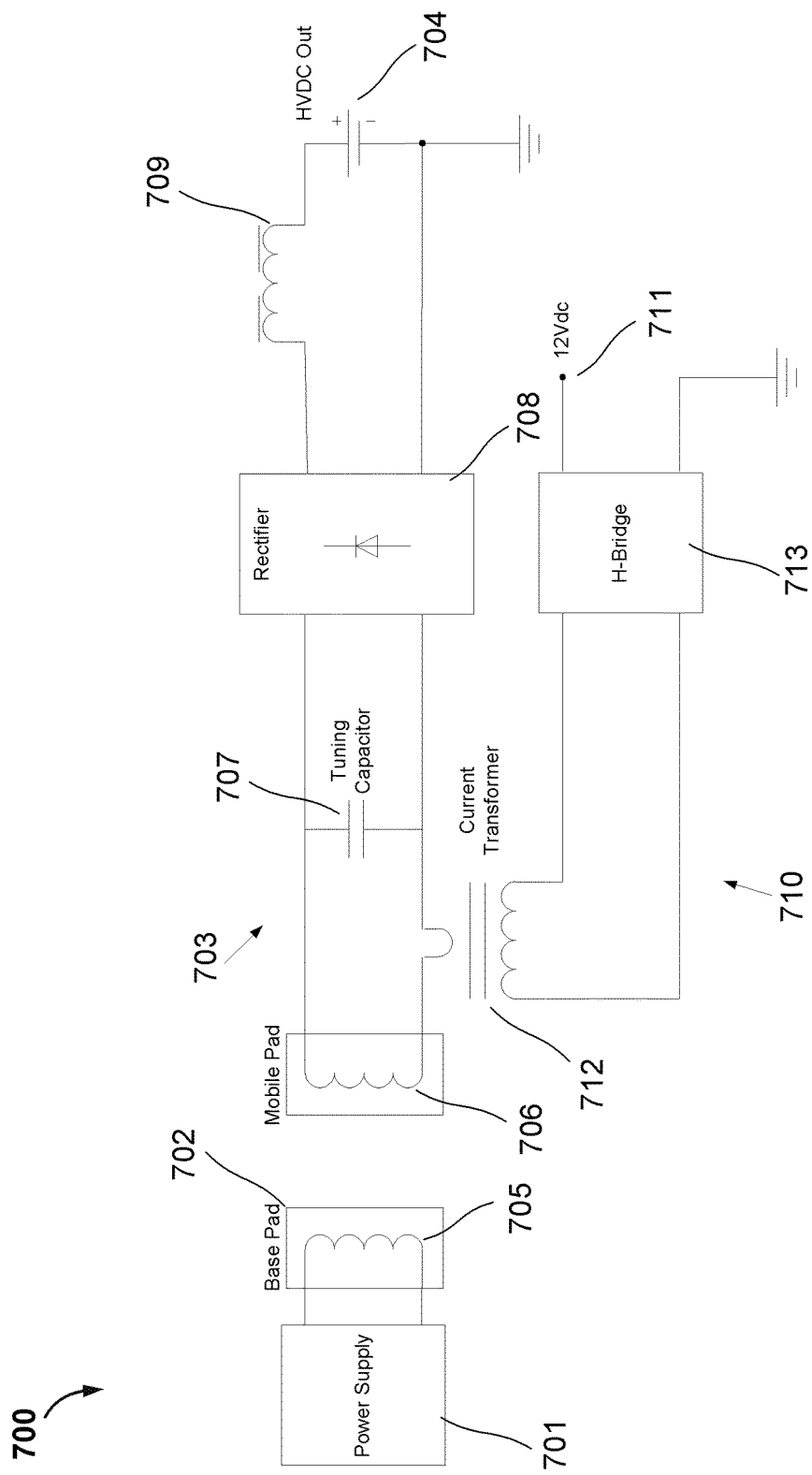
FIG. 7 is a schematic diagram of exemplary components of a wireless power transfer system according to an embodiment.

FIG. 7 is a schematic diagram of exemplary components of a wireless power transfer system 700 according to an embodiment. A power supply 701 provides power to a load which, in the embodiment of FIG. 7 is represented by chargeable battery 704. Power is transferred to the load by means of inductive power transfer between wireless power transfer transmitter device 702 and wireless power transfer receiver device 703, each comprising an inductive element 705 and 706 respectively, for example an induction coil. The circuit in the receiver device 703 is a parallel tuned resonant circuit, which comprises a capacitive element 707 connected in parallel across the secondary inductor 706. A rectifier 708 converts the alternating current induced in the secondary inductor 706 to direct current, which is supplied to battery 704. A direct current inductive element 709 may also be coupled between the rectifier 708 and battery 704.

Wireless power transfer system 700 further comprises an auxiliary circuit 710 which comprises a receiver-side auxiliary power supply 711. Auxiliary power supply 711 may comprise, for example a 12 V battery. Auxiliary power supply 711 is operable to generate a current in secondary inductor 706 by supplying or injecting current into the circuit in the power receiver device 703 by means of a current transformer 712, which is connected in series with the secondary inductor 706. Connected between the current transformer 712 and auxiliary power supply 711 is a device, for example such as an H bridge 713 as illustrated, for allowing the power supply 711 to selectively receive or provide power.

During charging of the battery 704, power is transferred from the transmitter device 702 to the receiver device 703 and then to the battery 704. Power may also be transferred to the auxiliary power supply 711 via the current transformer 712, for example to charge the auxiliary power supply 711 or to provide power for auxiliary systems such as internal electronics of the wireless power transfer receiver device 703.

When using the receiver device 703 for alignment or device detection/identification purposes, power may be supplied from the auxiliary power supply 711 to inject current into the tuning circuit and thereby energize the secondary inductor 706. This induces a current into the primary inductor 705 of the transmitter device 702, which may be detected by the power supply 701 and enable the inductor alignment or device detection/identification to take place. Appropriate selection of the turns ratio of the current transformer 712 allows power to be provided from an auxiliary power supply 711 having a low voltage, such as 12 V battery, for the purposes of generating a small current in the transmitter device 702.

The switches in the H bridge 713 may be switched between two states and corresponding two operation modes to enable the voltage to be applied in a desired direction. The switches may be controlled by an appropriate control system (not shown).

Figure 8:
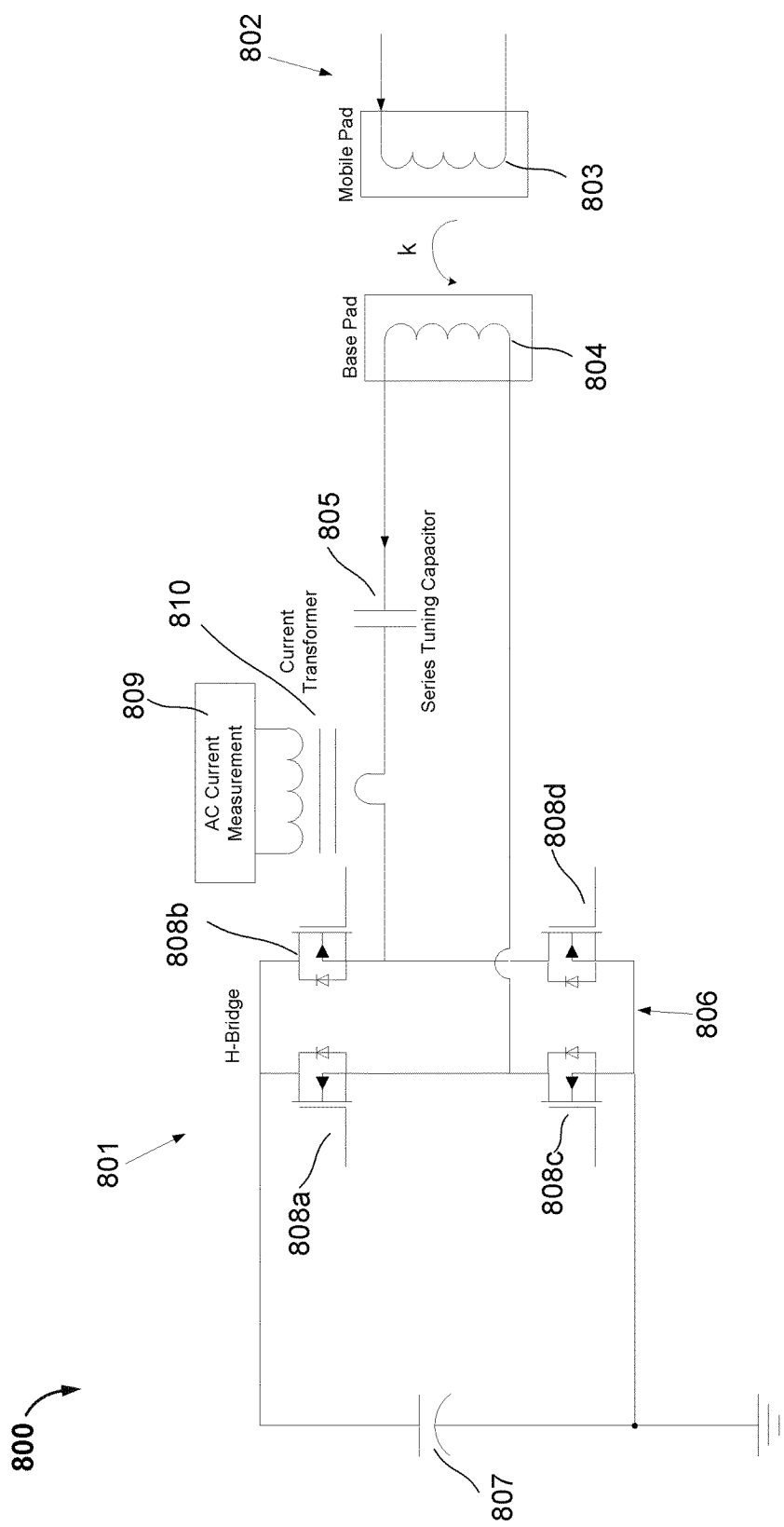
FIG. 8 is a schematic diagram of exemplary components of a wireless power transfer system according to another embodiment.

FIG. 8 is a schematic diagram of exemplary components of a wireless power transfer system 800 according to an embodiment. FIG. 8 shows components of a wireless power transfer transmitter device 801 according to an embodiment. During the preliminary alignment phase of operation, the inductive element 803 in the power receiver device 802 may be energized by a current in a similar manner as has been described with respect to FIG. 7. A current is consequently induced in the inductive element 804 of the power transmitter device 801. The transmitter device 801 includes a resonant inductive circuit, which may, for example, be formed by placing a tuning capacitor 805 in series with an inductive element 804. The tuned circuit may be coupled to a power supply 807, for example by means of an H bridge 806 formed of four MOSFETs 808.

Coupled to the tuned circuit is a current measurement device 809, which may be coupled in any appropriate manner, for example, by means of a current transformer 810 as in the embodiment shown in FIG. 8.

Wireless power transfer system 800 enables a current in the power transmitter device 801 that is induced by a current in the receiver inductive element 803 to be measured. Once measured by current measurement device 809, appropriate signals are sent to a system controller device, which may initiate an alignment enhancement process or begin charging, according to the exemplary method 600 discussed with respect to FIG. 6A, for example.

Advantageously, parts of the power transmitter device 801 shown in FIG. 8 may be used in existing wireless power transfer systems. To enable an induced current to be measured, the current measurement device 809 may be added, which may involve a simple modification. For an induced current to flow, two of the MOSFETs 808 may be closed to create a short circuit current path, for example, either transistors 808*a* and 808*b* may be closed or transistors 808*c* and 808*d* may be closed. A system controller may therefore control the configuration of H bridge 806.

The systems and circuits illustrated in FIGS. 7 and 8 show examples by which the systems and methods described in this disclosure may be put into practice and their advantages realized. One advantage of the use of a current transformer 712 to connect an auxiliary power supply 711 to the power receiver circuit is that the current transformer may also be used for other purposes, such as current sensing. An auxiliary power supply may also be useful in the event of main power failure so that some power is available for control systems of the power receiver device and the system can shut down in a controlled manner.

Figure 9:
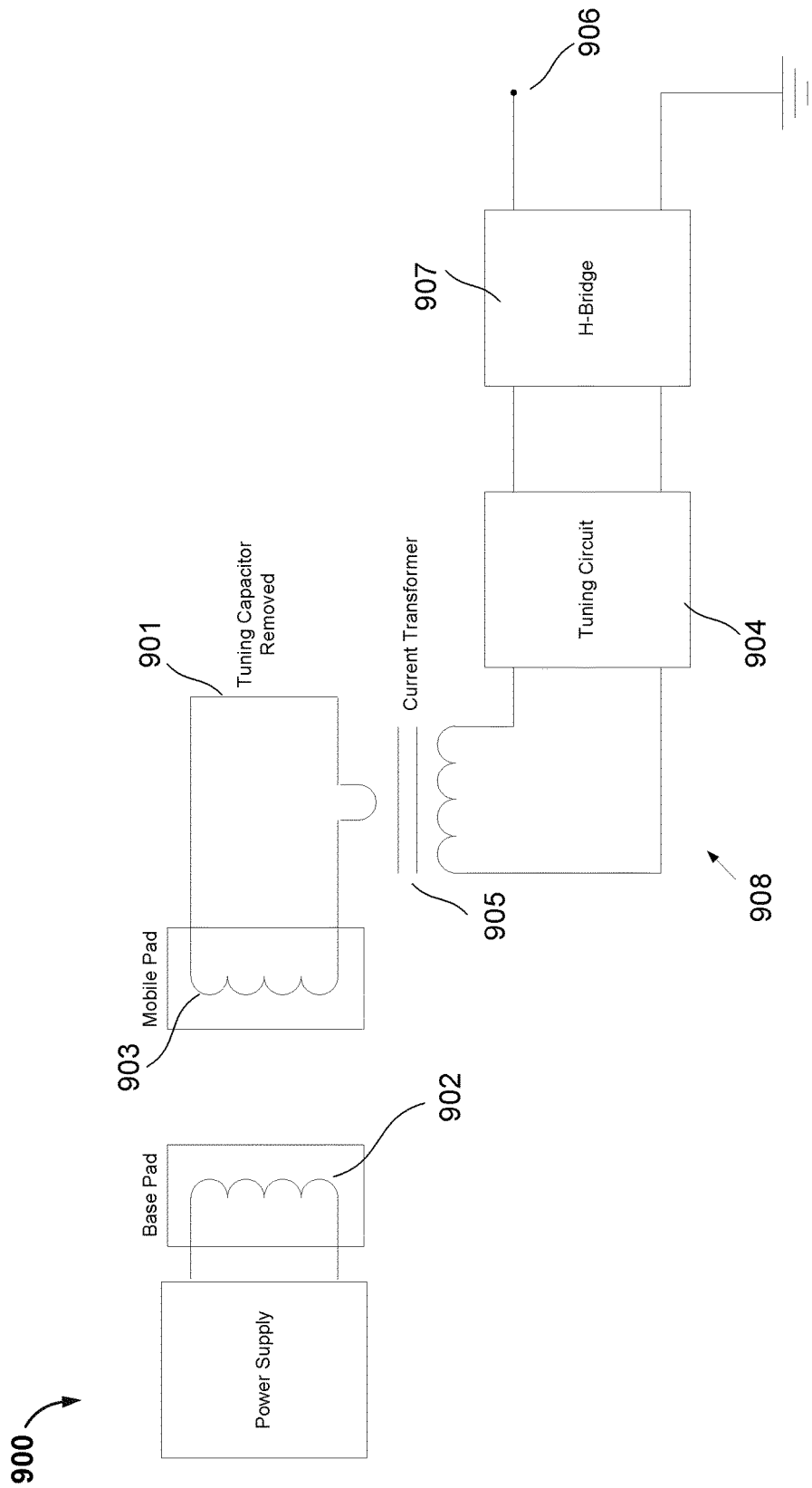
FIG. 9 is a simplified schematic diagram of a wireless power transfer system according to another exemplary embodiment.

In some embodiments, the rectifier 708 shown in FIG. 7 may be short circuited to ease the complexity of injecting current into the receiver circuit. For example, a shorting switch may be placed across the rectifier 708 or a controllable rectifier may be used in "shorting" mode. If the rectifier 708 is short circuited, the tuning capacitor 707 will also be short circuited and the resulting equivalent circuit is shown in FIG. 9, which is a simplified schematic diagram of a wireless power transfer system 700 according to another exemplary embodiment. In system 900, circuit path 901 has short circuited both the rectifier and tuning capacitor shown in FIG. 7.

Shorting out the tuning capacitor affects the tuning of the resonant inductive circuit, which may affect the efficiency of power transfer between the inductive elements in the transmitter and receiver devices 902 and 903. To compensate, a tuning circuit 904 may be connected between the current transformer 905 and the H bridge 907 in the auxiliary circuit 908. The tuning circuit 904 may comprise an arrangement of reactive elements to suitably tune the shorted circuit back near resonance and therefore a high level of efficiency. In some embodiments, elements of the tuning circuit 904 may be selected to tune the receiver circuit to the operating frequency of the original, non-shorted circuit. It may be advantageous to keep the operating frequencies of the system in the different modes the same but bypass the tuning circuit 904 during normal operation, for example, using a shorting or opening switch. In other embodiments, the elements of the tuning circuit 904 may tune the receiver circuit to resonance at a different operating frequency. One advantage of a different resonant frequency is that tuning circuit 904 may have less effect on the normal operation of the power transfer system, for example, when power is being transferred from the power supply 701 to the load 704 as shown in FIG. 7.

Figure 10:
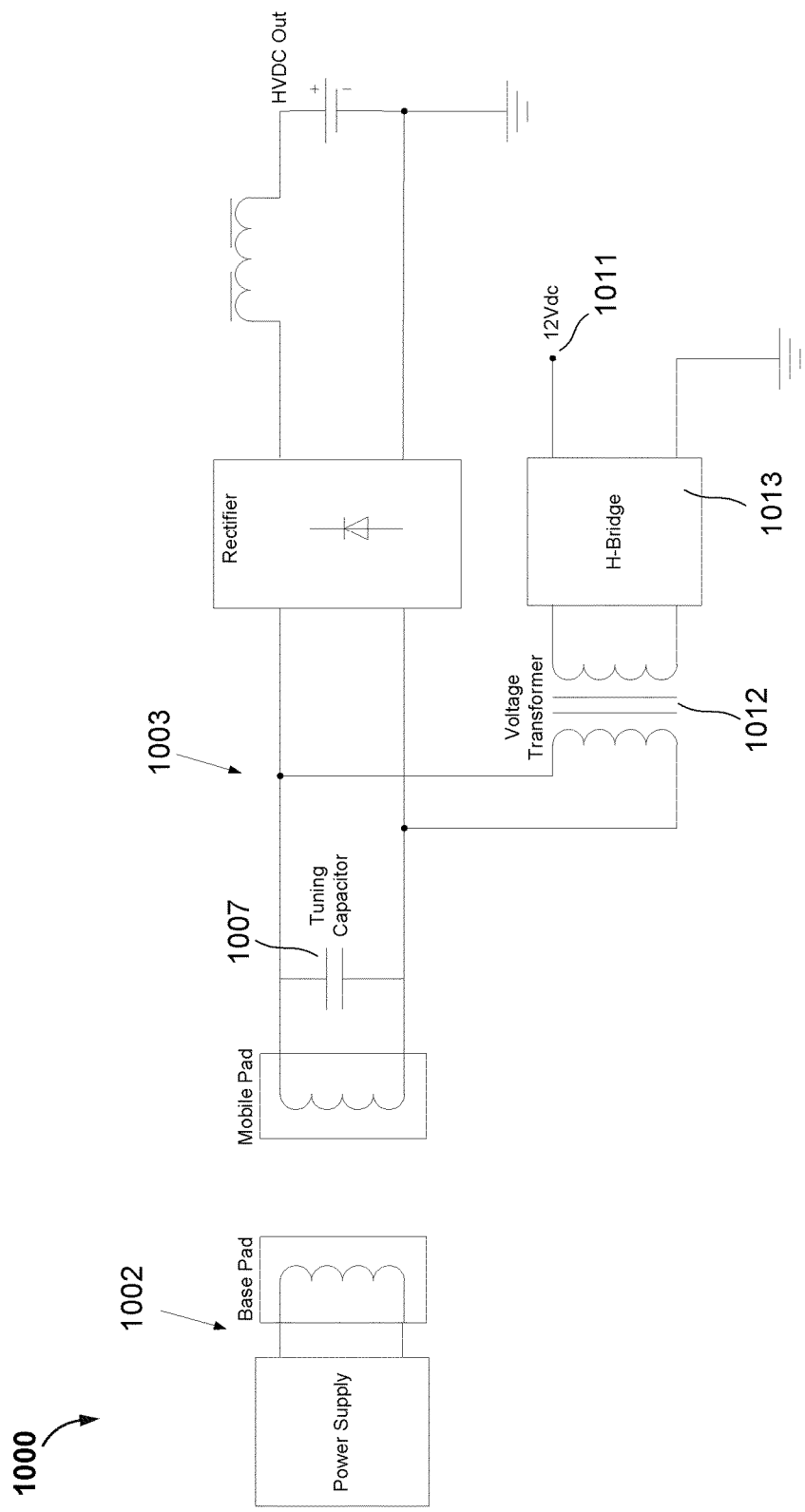
FIGS. 10, 11, 12, 13, 14, 15, 16, 17 and 18 are schematic diagrams of exemplary components of wireless power transfer systems according to further exemplary embodiments.

FIG. 10 is a schematic diagram of exemplary components of a wireless power transfer system 1000 according to another embodiment. System 1000 is similar to the power transfer system 700 shown in FIG. 7 and may operate in an analogous manner. Those features that may differ from system 700 will now be described.

In system 1000, the auxiliary power supply 1011 is coupled to the resonant circuit of power receiver device 1003 by means of a voltage transformer 1012 connected in parallel with tuning capacitor 1007. Voltage transformer 1012 is driven by the H bridge 1013 to inject current into the receiver device 1003 during the alignment or detection/identification mode. Again, the turns ratio of the voltage transformer 1012 may be selected to allow power to be provided from an auxiliary power supply 1011 having a low voltage, such as 12 V battery, for the purposes of generating a small current in the transmitter device 1002.

Coupling an auxiliary power supply to inject current into the power receiver device using a voltage transformer may have advantages in some circumstances. Some circuit topologies may involve a relatively lower range of voltages that may be outputted by the auxiliary circuit. The output current may vary with loading while the output voltage is generally proportional to the auxiliary battery voltage which, due to the chemistry of typical battery types, may only vary slightly compared to the variation in output current. This may make the embodiment comprising a voltage transformer more suitable.

Figure 11:
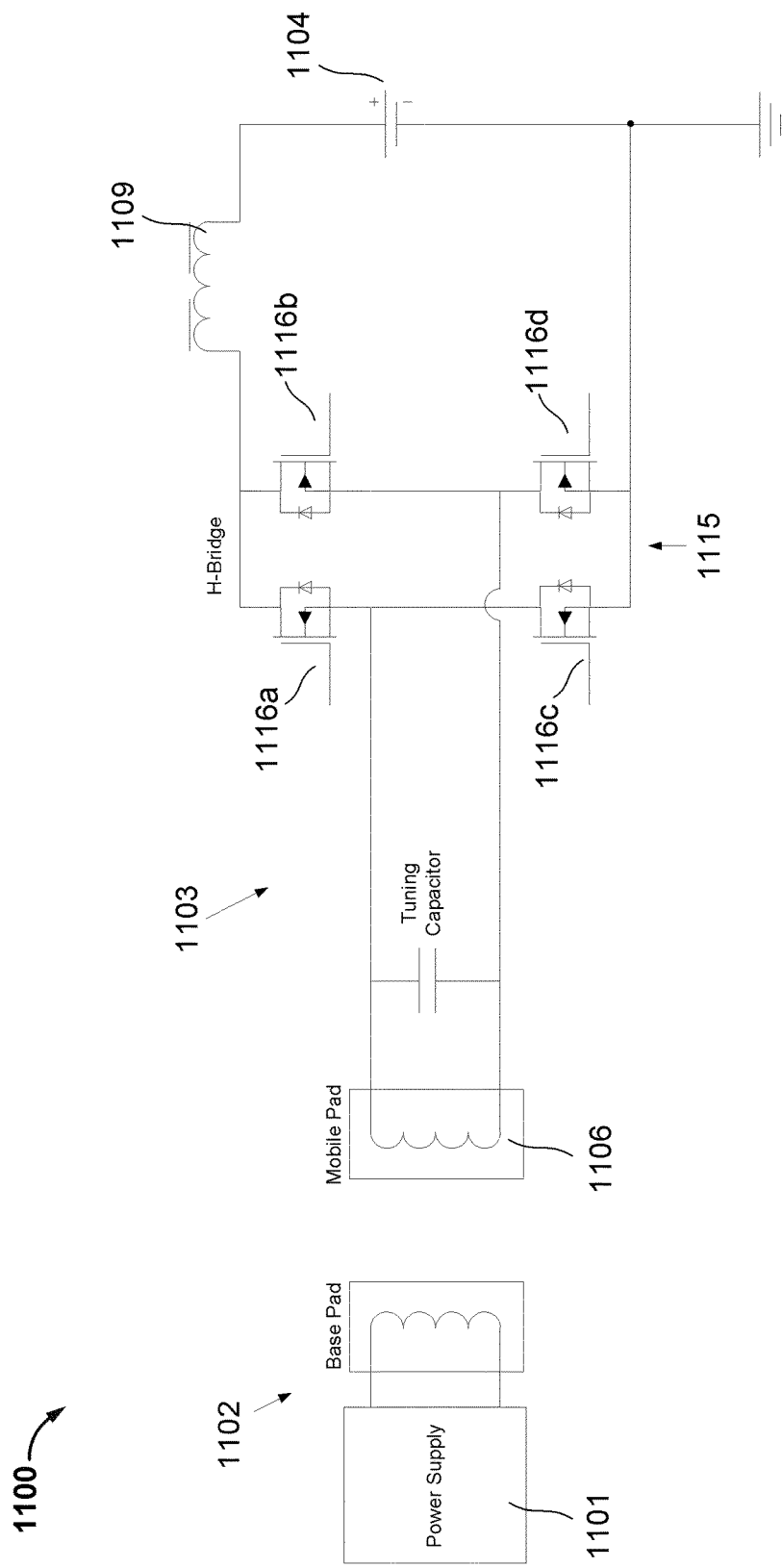

FIG. 11 is a schematic diagram of exemplary components of a wireless power transfer system 1100 according to another embodiment. In system 1100, the means for generating a current in the inductive element 1106 of the receiver device 1103 comprises the electric vehicle battery 1104 and there may be no auxiliary power supply as in the systems shown in FIGS. 7 and 10. A reversible rectifier 1115 couples the battery 1104 to the resonant receiver circuit to rectify the alternating current induced in the receiver inductor 1106. Reversible rectifier 1115 may take the form of an H bridge such that the battery 1104 can selectively receive power from or provide power to the receiver inductive element 1106. In the embodiment shown in FIG. 11, the H bridge 1115 is formed of four MOSFETs 1116. In other embodiments, other switching elements may be used.

The circuitry of the wireless power transfer receiver device 1103 shown in FIG. 11 is analogous to the circuitry of the wireless power transfer transmitter device 801 shown in FIG. 8. The circuitry of the receiver device 1103 may conduct power transfer in two directions, both to charge the battery 1104 and to transfer power back into the power grid from the battery 1104. However, in accordance with exemplary methods, the battery 1104 is also able to supply power back to the transmitter device 1102 for the purposes of alignment and transmitter detection/identification.

In one embodiment, the DC inductor 1109 connected between the H bridge 1115 and the battery 1104 may be able to disconnect from the circuit when the battery 1104 injects a current into the receiver inductor 1106 during the alignment/identification mode. For example, a MOSFET or other shorting switch may be connected across the DC inductor 1109 and controlled by way of a system controller device (not shown).

One advantage of the embodiment of receiver device 1103 shown in FIG. 11 is that receiver device 1103 may require fewer additional components in comparison to other receiver devices that may not be able to perform exemplary methods disclosed herein. For example, the system 1100 of FIG. 11 may use the vehicle battery 1104 to provide current injection into the secondary inductor 1106 and therefore, in some aspects, may avoid the complexity and cost of an auxiliary power supply.

In the systems discussed in FIGS. 7, 10, and 11, the amount of power transferred back to the transmitter device when performing alignment or transmitter detection/identification may be significantly less than the amount of power that would be transferred during the process of transferring usable power back into the power supply. Only a small detectable signal may be transferred, rather than usable power. As such, the components of the system for these purposes may be rated differently than if they were used to transfer power in the reverse direction, which may enable cheaper components like transistors and/or diodes to be used.

Figure 12:
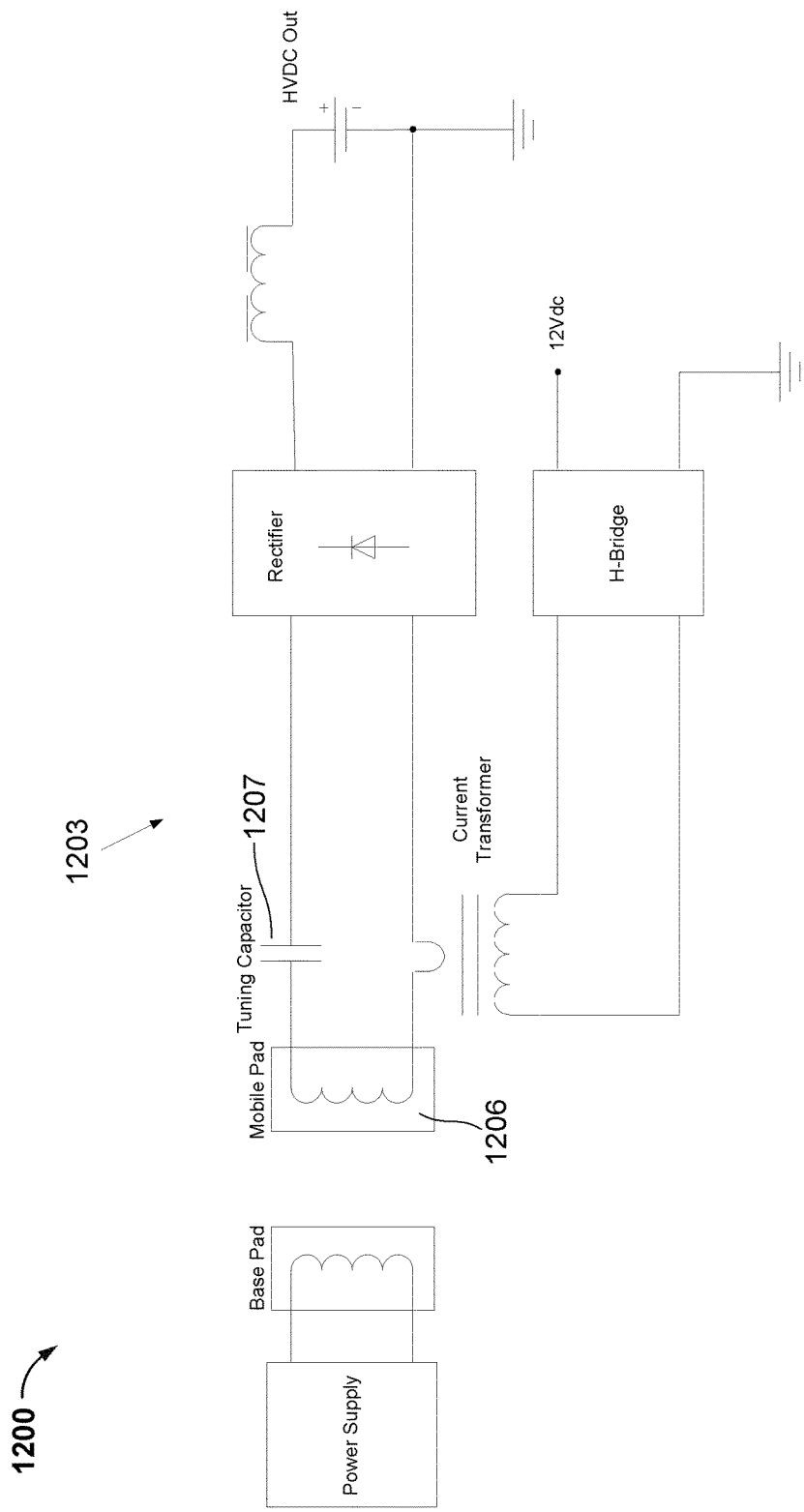
Figure 13:
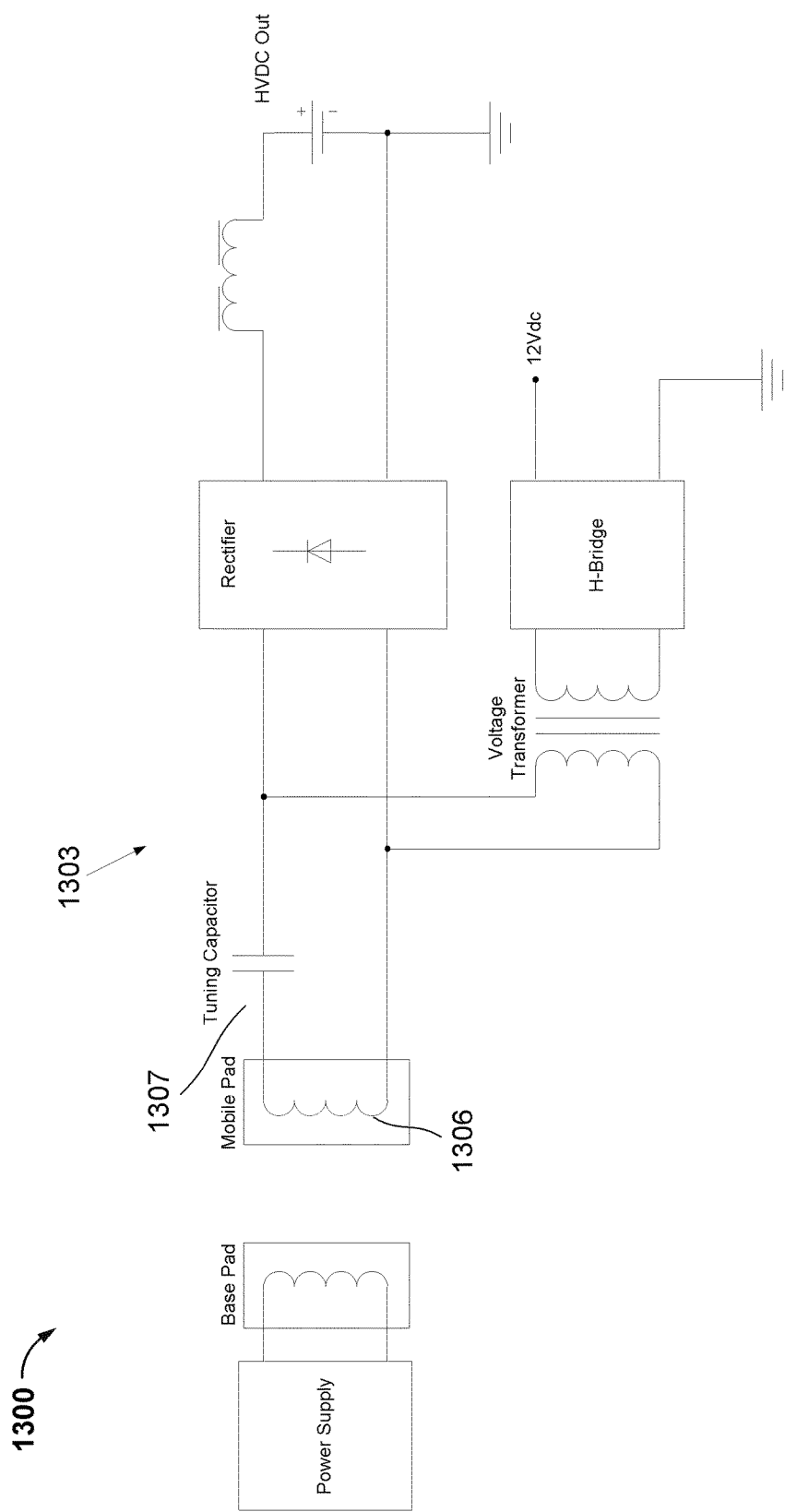
Figure 14:
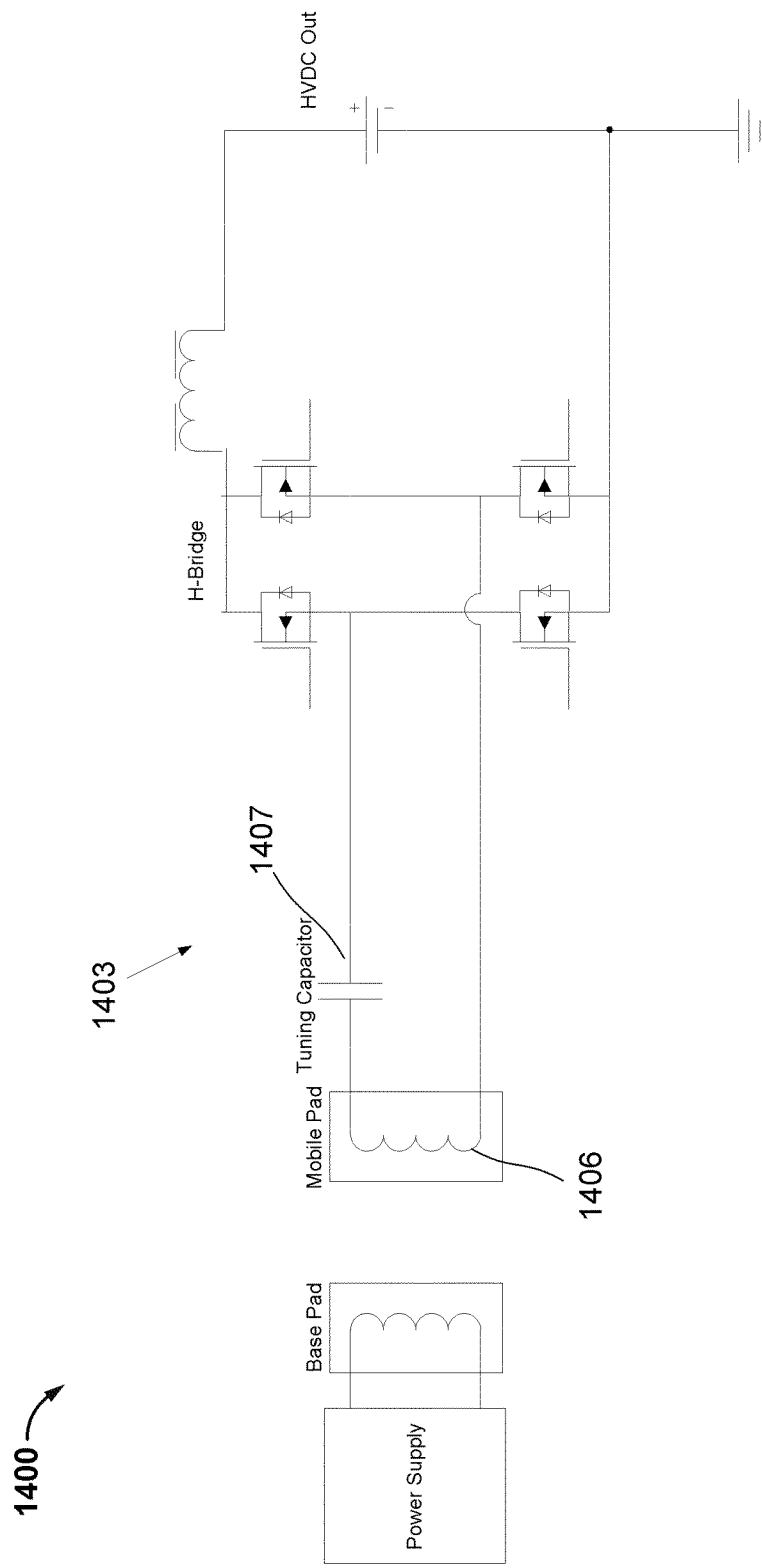

FIG. 12, FIG. 13, and FIG. 14 are schematic diagrams of exemplary components of wireless power transfer systems 1200, 1300, and 1400, respectively, according to further embodiments. Systems 1200, 1300, and 1400 are similar to systems 700, 1000, and 1100 shown in FIG. 7, FIG. 10, and FIG. 11, respectively, but systems 1200, 1300, and 1400 illustrate resonant circuits using series tuning instead of parallel tuning. As such, the power receiver circuits 1203, 1303, and 1403 each comprise a tuning capacitor 1207, 1307, and 1407 in series with the inductive element 1206, 1306, and 1406 of the power receiver circuits 1203, 1303, and 1403, respectively.

Figure 15:
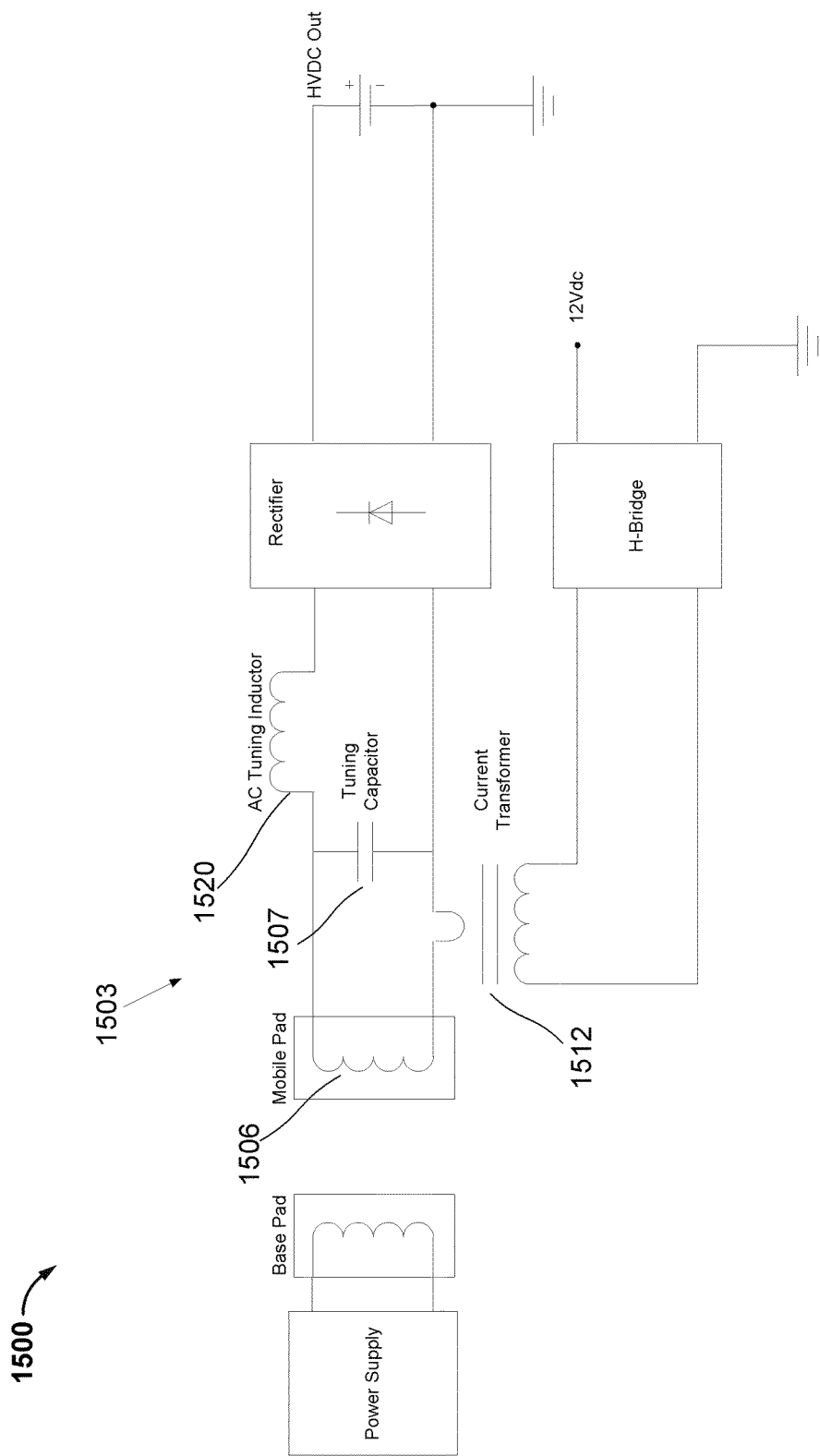
Figure 16:
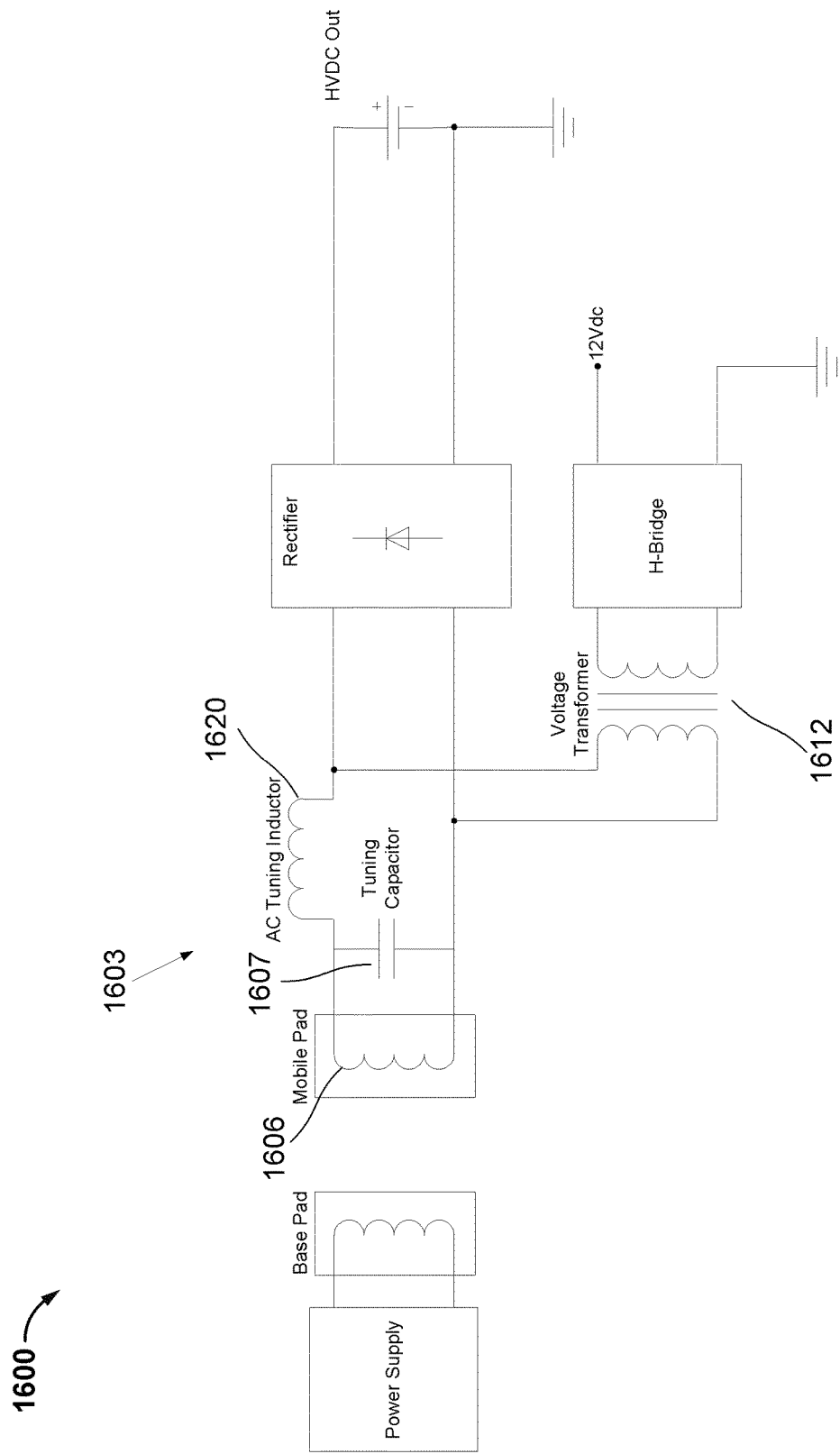
Figure 17:
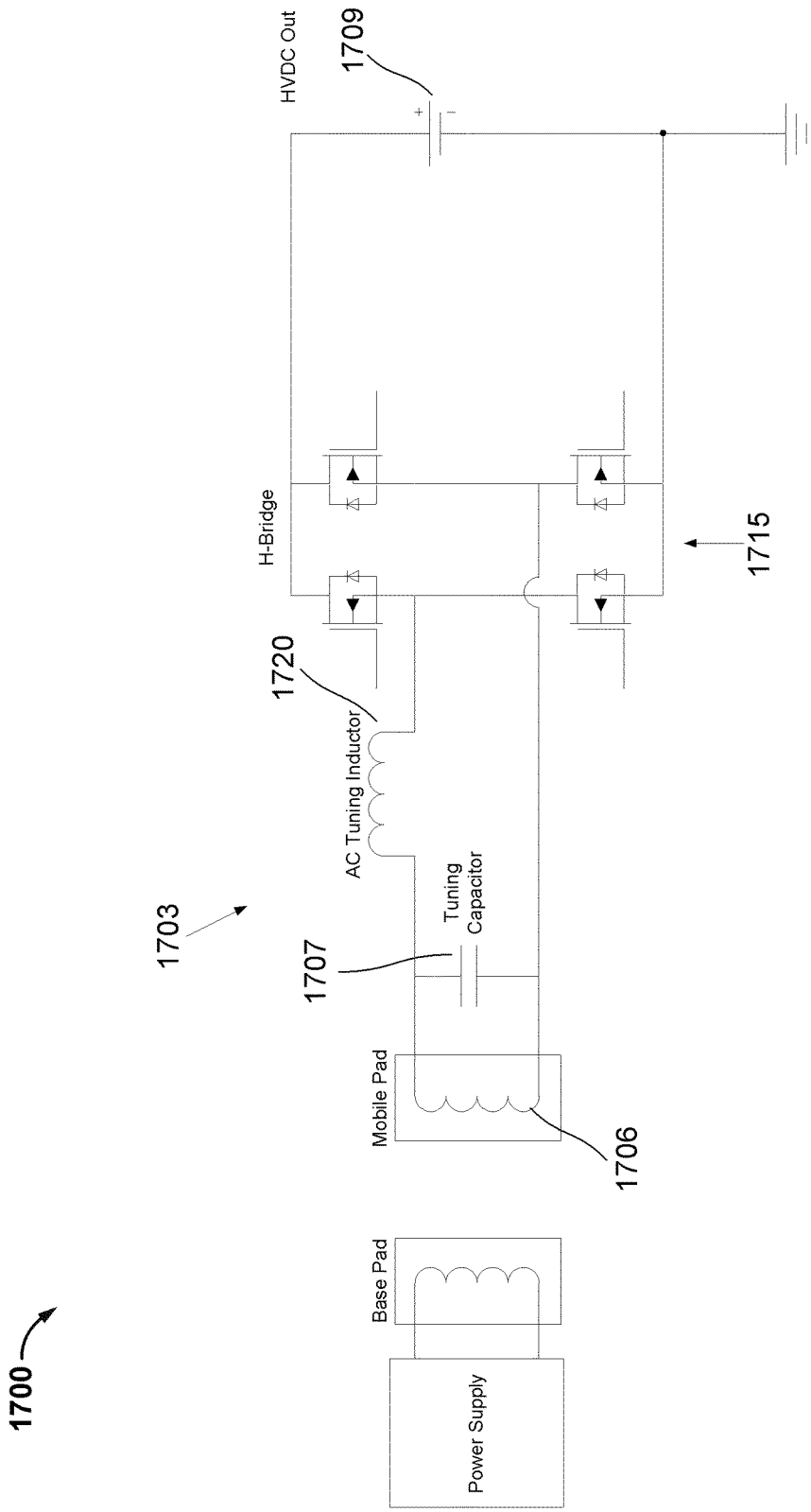

FIG. 15, FIG. 16, and FIG. 17 are schematic diagrams of exemplary components of wireless power transfer systems 1500, 1600, and 1700, respectively, according to further embodiments. System 1500 is similar to systems 700 and 1200 in that an auxiliary power supply is connected to the receiver device 1503 by means of a current transformer 1512. System 1600 is similar to systems 1000 and 1300 in that an auxiliary power supply is connected to the receiver device 1603 by means of a voltage transformer 1612. System 1700 is similar to systems 1100 and 1400 in that the battery 1704 may be used to inject current back into the receiver circuit 1703 through a reversible rectifier 1715. Where systems 1500, 1600, and 1700 differ from the similar systems is that the resonant circuits in the receiver devices are LCL tuned circuits where tuning of the secondary circuit is achieved using a capacitor 1507, 1607, 1707 and an AC tuning inductor 1520, 1620, 1720 connected in parallel and series, respectively, with the receiving inductor 1506, 1606, 1706.

Figure 18:
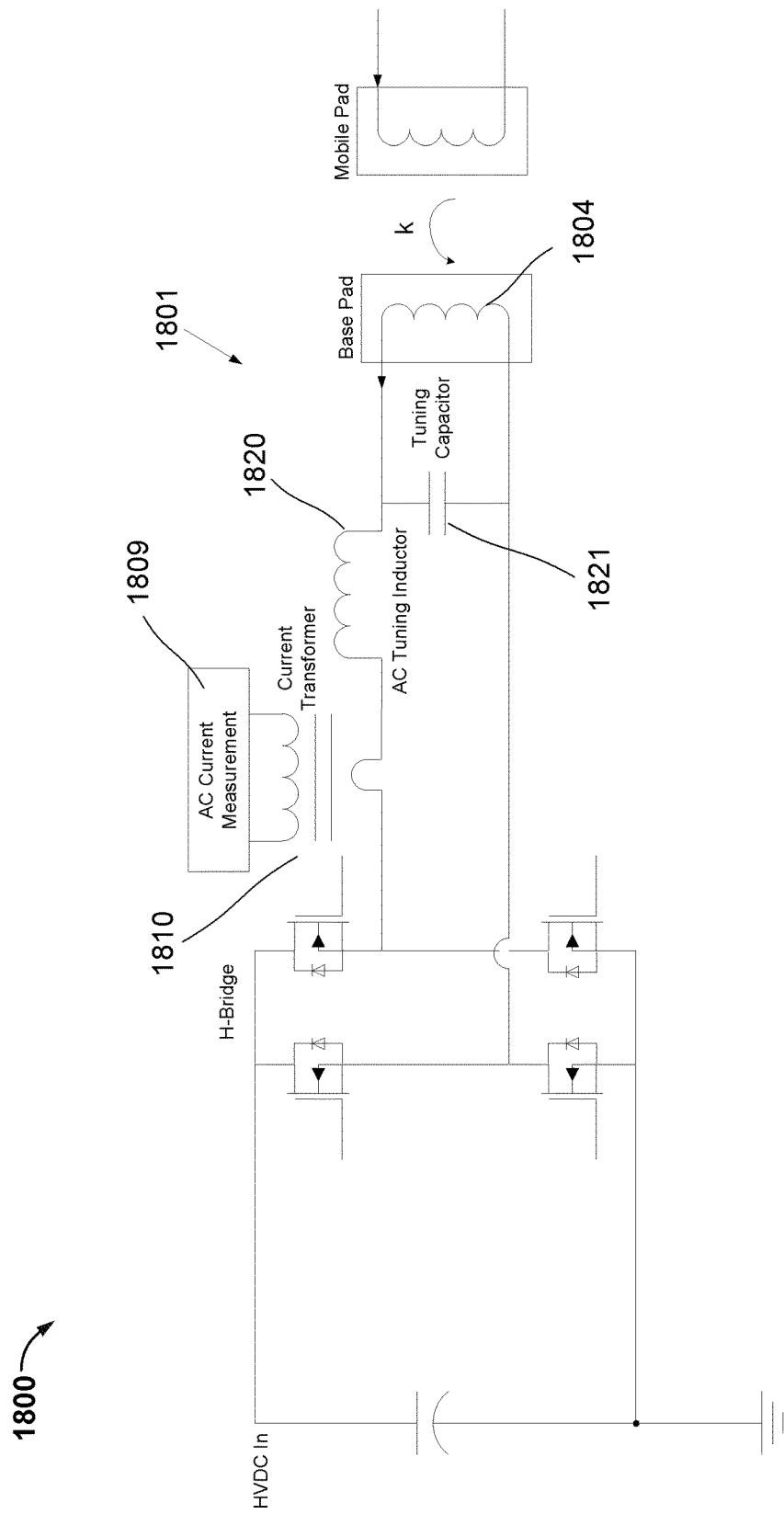

FIG. 18 is a schematic diagram of exemplary components of a wireless power transfer system 1800 according to an alternative embodiment. Similar to the system 800 shown in FIG. 8, system 1800 shows exemplary componentry of a wireless power transfer transmitter device 1801 which has a current measurement device 1809 coupled to a resonant circuit by means of a current transformer 1810. The resonant circuit in the transmitter device 1801 comprises an LCL tuned supplying resonant inductor 1804, the inductor 1804 being connected in parallel with a tuning capacitor 1821 and an AC tuning inductor 1820.

Figure 19:
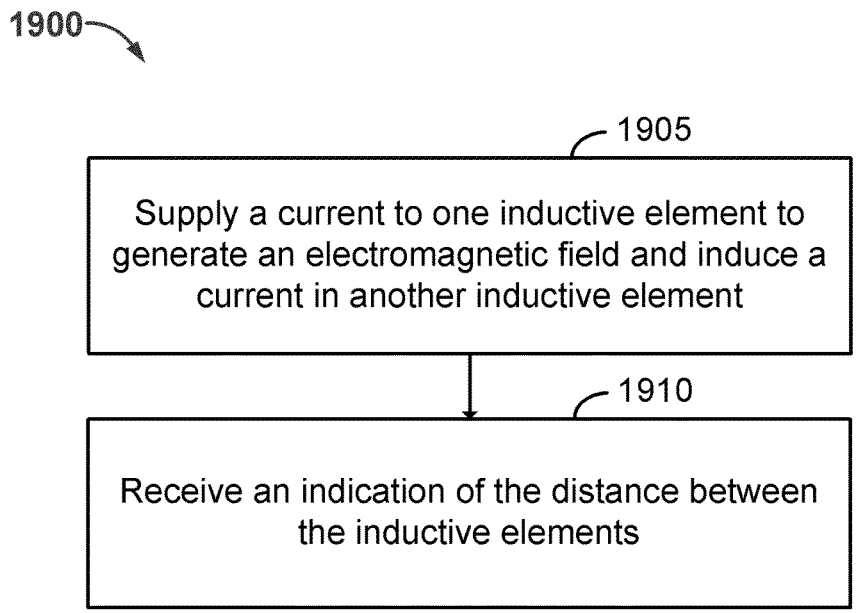
FIG. 19 is a flowchart of an exemplary method of operating a wireless power receiver.

FIG. 19 is a flowchart of an exemplary method 1900 of operating a wireless power receiver. The method 1900 may be performed using the wireless power transfer receiver device 703 of FIG. 7 and the electric vehicle charging system 314 of FIG. 3, for example. Although method 1900 is described below with respect to the elements of the wireless power transfer systems 300 and 700 of FIGS. 3 and 7, other components may be used to implement one or more of the steps.

At block 1905, a current is supplied to one inductive element of a wireless power receiver to generate an electromagnetic field and induce a current in another inductive element of a wireless power transmitter. The wireless power transmitter may be configured to determine an indication of a distance between the one inductive element and the another inductive element based on the induced current in the another inductive element. The auxiliary circuit 710 may be configured to supply the current. The secondary inductor 706 may correspond to the one inductive element, and the primary inductor 705 may correspond to the another inductive element.

At block 1910, an indication of the distance between the inductive elements is received at the wireless power receiver from the wireless power transmitter. The indication may be received via the guidance link 366 and/or the alignment link 356.

Figure 20:
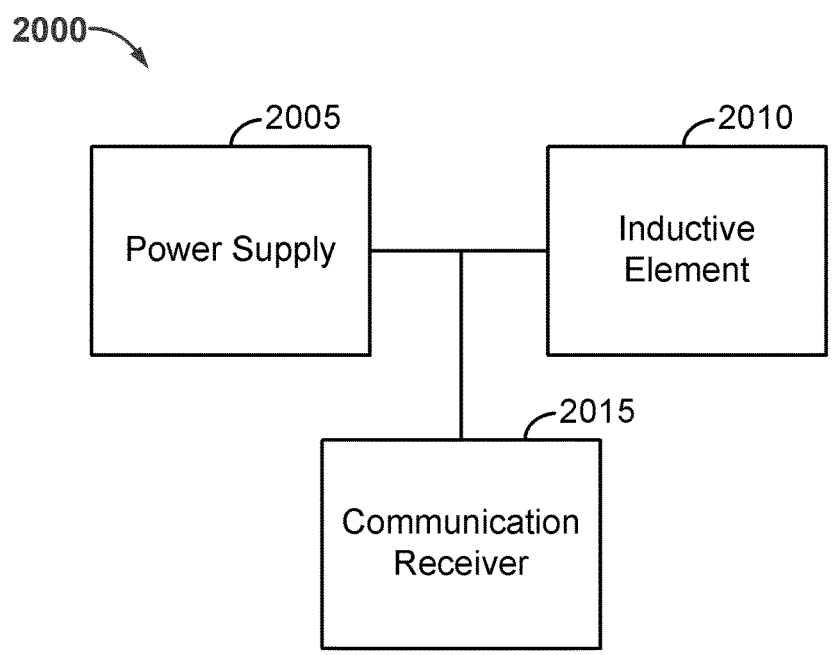
FIG. 20 is a functional block diagram of an exemplary wireless power receiver.

FIG. 20 is a functional block diagram of an exemplary wireless power receiver 2000. The wireless power receiver 2000 includes a power supply 2005, an inductive element 2010, and a communication receiver 2015. The power supply 2005 may be configured to perform one or more of the functions discussed with respect to block 1905 of FIG. 19. The power supply 2005 may correspond to the auxiliary circuit 710 of FIG. 7, for instance. The inductive element 2010 may correspond to the secondary inductor 706 of FIG. 7, for instance. The communication receiver 2015 may be configured to perform one or more of the functions discussed with respect to block 1910 of FIG. 19. The communication receiver 2015 may correspond to the electric vehicle guidance system 364 or the electric vehicle alignment system 354 of FIG. 3, for instance.

Moreover, in one aspect, means for supplying a current may comprise the power supply 2005. In another aspect, means for receiving wireless power from an electromagnetic field may comprise the inductive element 2010. In a further aspect, means for receiving an indication of a distance between inductors may comprise the communication receiver 2015.

Figure 21:
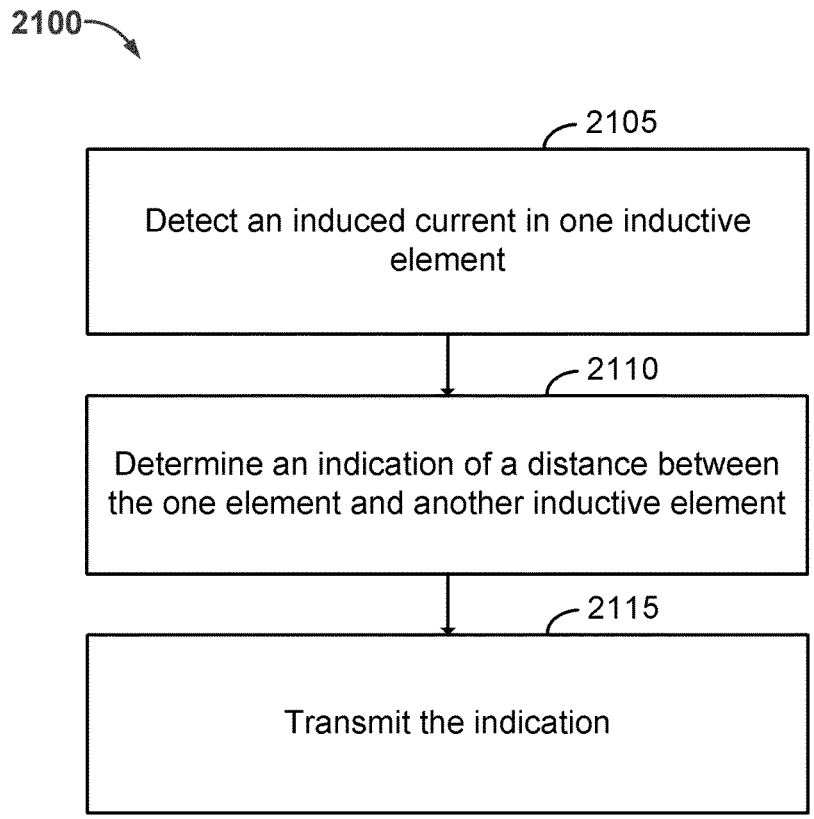
FIG. 21 is a flowchart of an exemplary method of operating a wireless power transmitter.

FIG. 21 is a flowchart of an exemplary method 2100 of operating a wireless power transmitter. The method 2100 may be performed using the wireless power transfer transmitter device 801 of FIG. 8 or base wireless power charging system 302 of FIG. 3, for example. Although method 2100 is described below with respect to the elements of the wireless power transfer systems 300 and 800 of FIGS. 3 and 8, other components may be used to implement one or more of the steps.

At block 2105, an induced current is detected in one inductive element of a wireless power transmitter. The induced current is induced in the one inductive element by an electromagnetic field generated by a current in another inductive element of a wireless power receiver. The current measurement device 809 may be configured to detect the induced current in the one inductive element. The inductive element 804 may correspond to the one inductive element, and the inductive element 803 may correspond to the another inductive element.

At block 2110, an indication of the distance between the one inductive element and the another inductive element is determined based on the induced current in the one inductive element. The base charging system controller 342 may be configured to determine the indication of the distance, for example.

At block 2115, the indication is transmitted to the wireless power receiver. The indication may be transmitted by the base charging guidance system 362 or base charging alignment system 352 via the guidance link 366 or alignment link 356, for instance.

Figure 22:
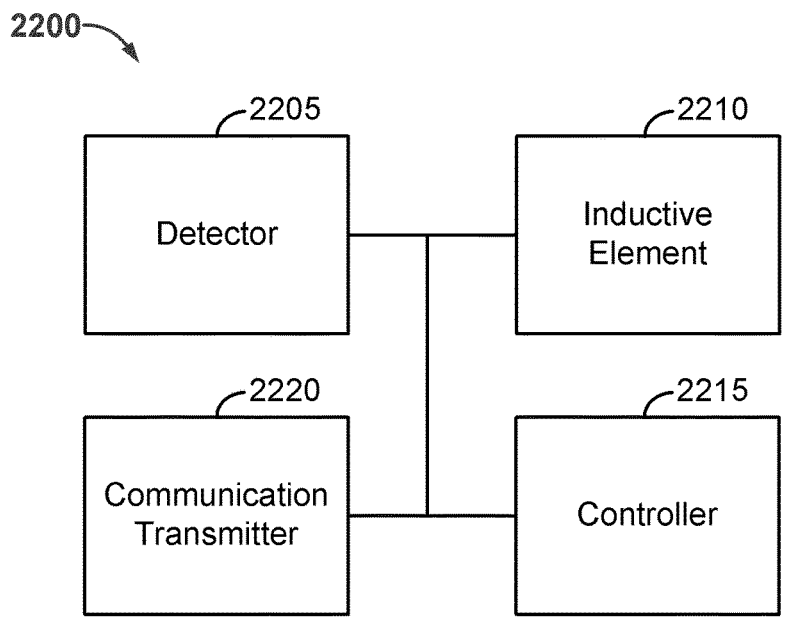
FIG. 22 is a functional block diagram of an exemplary wireless power transmitter.

FIG. 22 is a functional block diagram of an exemplary wireless power transmitter 2200. The wireless power transmitter 2200 includes a detector 2205, an inductive element 2210, controller 2215, and a communication transmitter 2220. The detector 2005 may be configured to perform one or more of the functions discussed with respect to block 2105 of FIG. 21. The detector 2205 may correspond to the current measurement device 809 of FIG. 8. The inductive element 2210 may correspond to the inductive element 804 of FIG. 8. The controller 2215 may be configured to perform one or more of the functions discussed with respect to block 2110 of FIG. 21. The controller 2215 may correspond to the base charging system controller 342 of FIG. 3. The communication transmitter 2220 may be configured to perform one or more of the functions discussed with respect to block 2115 of FIG. 21. The communication transmitter 2220 may correspond to the base charging guidance system 362 or base charging alignment system 352 of FIG. 3.

Moreover, in one aspect, means for detecting an induced current in an inductive element may comprise the detector

2205. In another aspect, the means for generating an electromagnetic field may comprise the inductive element 2210. In a further aspect, means for determining an indication of the distance between inductors may comprise the controller 2215. In yet another aspect, means for transmitting the indication may comprise the communication transmitter 2220.

It will be understood that the appropriate circuits may be used in alternative embodiments depending on the circumstances in which the respective wireless power transfer system is expected to operate. This disclosure is not limited to any particular configuration of tuning reactive elements used in conjunction with an inductive power transfer circuit, and the parallel tuned, series tuned, and LCL tuned resonant circuits are provided herein by way of example only. Furthermore, the disclosure is not limited to any particular receiver-side means of generating a current in the receiver inductor and the voltage transformer, current transformer, and reversible rectifier techniques are discussed herein by way of example only.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (for example, electronic devices such as personal computing devices and the like).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver comprising:
a power receiving circuit configured to receive wireless power from a first electromagnetic field generated by first wireless power transmitter;
a controller configured to detect a presence of the first wireless power transmitter; and
a power supply configured to:
in response to the detected presence of the first wireless power transmitter, generate a second electromagnetic field by the power receiving circuit that induces a current in the first wireless power transmitter or in a second wireless power transmitter, causing the first wireless power transmitter or the second wireless power transmitter to determine a distance between the power receiving circuit and the first wireless power transmitter or the second wireless power transmitter based on a magnitude of the current, and
receive power during wireless power transfer from the first wireless power transmitter via the first electromagnetic field generated by the first wireless power transmitter.

2. The wireless power receiver of claim 1, wherein the power receiving circuit is further configured to receive wireless power from a third electromagnetic field generated by one of a plurality of inductive coils associated with the second wireless power transmitter.

3. The wireless power receiver of claim 1, wherein the power supply is further configured to generate the second electromagnetic field by the power receiving circuit based on user input.

4. The wireless power receiver of claim 1, further comprising an H bridge connecting the power supply to the power receiving circuit.

5. The wireless power receiver of claim 1, wherein the power supply comprises a battery configured to receive power during wireless power transfer from the wireless power transmitter to the wireless power receiver.

6. The wireless power receiver of claim 1, comprising one of a voltage transformer and a current transformer configured to couple the power supply to a circuit comprising the power receiving circuit.

7. The wireless power receiver of claim 1, further comprising a communication transmitter configured to notify the second wireless power transmitter before the power supply generates the second electromagnetic field.

8. The wireless power receiver of claim 2, comprising a communication receiver configured to receive an indication of the distance between the power receiving circuit and the inductive coil based on the current induced in the wireless power transmitter.

9. The wireless power receiver of claim 8, comprising an alignment controller configured to align the wireless power receiver with the second wireless power transmitter based on the indication before the second wireless power transmitter initiates wireless power transfer to the wireless power receiver.

10. The wireless power receiver of claim 8, wherein the communication receiver is further configured to continuously receive the indication from the wireless power transmitter.

11. The wireless power receiver of claim 8, wherein the indication comprises a value indicative of a magnitude of the current.

12. The wireless power receiver of claim 8, further comprising a display configured to display the indication.

13. The wireless power receiver of claim 12, wherein the display comprises a user interface configured to assist in aligning the wireless power receiver with the second wireless power transmitter.

14. A wireless power transmitter comprising:
a first inductive coil of a plurality of inductive coils configured to:
generate a first electromagnetic field for transferring wireless power to a wireless power receiver, and
generate a current in response to exposure to a second electromagnetic field generated by the wireless power receiver; and
a processor configured to:
detect the current in the first inductive coil induced by the second electromagnetic field generated by the wireless power receiver in response to a detected presence of the first inductive coil by the wireless power receiver,
determine a distance between the first inductive coil and the wireless power receiver based on a magnitude of the current induced in the first inductive coil by the second electromagnetic field,
determine, based on the determined distance, whether the first inductive coil and the wireless power receiver are aligned, and
based on the determination whether the first inductive coil and the wireless power receiver are aligned, generate the first electromagnetic field via the first inductive coil for wireless power transfer to the wireless power receiver.

15. The wireless power transmitter of claim 14, wherein the first inductive coil of the plurality of inductive coils is configured to generate the first electromagnetic field to transfer the wireless power to the wireless power receiver based on an indication of proximity to the wireless power receiver.

16. The wireless power transmitter of claim 14, wherein the detector is configured to measure a magnitude of the current.

17. The wireless power transmitter of claim 14, further comprising a communication receiver configured to receive a notification from the wireless power receiver, the notification notifying the wireless power transmitter before the second electromagnetic field is generated.

18. The wireless power transmitter of claim 14, comprising a communication transmitter configured to transmit the indication to the wireless power receiver.

19. The wireless power transmitter of claim 18, wherein the communication transmitter is further configured to continuously transmit the indication to the wireless power receiver.

20. A method of operating a wireless power receiver, the method comprising:
detecting, via a controller, a presence of a first wireless power transmitter configured to generate a first electromagnetic field;
in response to the detected presence of the first wireless power transmitter, generating, via a power receiving circuit and a power supply, a second electromagnetic field that induces a current in the first wireless power transmitter or in a second wireless power transmitter, causing the first wireless power transmitter or the second wireless power transmitter to determine a distance between the power receiving circuit and the first wireless power transmitter or the second wireless power transmitter based on a magnitude of the current; and receive power, via the power receiving circuit, during wireless power transfer from the first wireless power transmitter via a second electromagnetic field generated by the first wireless power transmitter.

21. The method of claim 20, further comprising receiving wireless power from a third electromagnetic field generated by one of a plurality of inductive coils associated with the second wireless power transmitter.

22. The method of claim 20, wherein generating the second electromagnetic field is based on user input.

23. The method of claim 20, further comprising notifying the second wireless power transmitter before generating the second electromagnetic field.

24. The method of claim 20, further comprising receiving an indication of the distance between the power receiving circuit and the the first wireless power transmitter based on the current induced in the first wireless power transmitter.

25. The method of claim 24, further comprising aligning the wireless power receiver with the wireless power transmitter based on the indication before the second wireless power transmitter initiates wireless power transfer to the wireless power receiver.

26. The method of claim 24, further comprising continuously receiving the indication.

27. The method of claim 24, wherein the indication comprises a value indicative of a magnitude of the current.

28. The method of claim 24, further comprising displaying the indication.

29. The method of claim 28, wherein said displaying the indication comprises displaying the indication on a user interface to assist in aligning the wireless power receiver with the second wireless power transmitter.

30. A method of operating a wireless power transmitter, the method comprising:
inducing a current in response to exposure to a first electromagnetic field generated by a wireless power receiver;
detecting the current in a first inductive coil of a plurality of inductive coils, the current induced by the first electromagnetic field generated by the wireless power receiver in response to a detected presence of the first inductive coil by the wireless power receiver;
determining a distance between the first inductive coil and the wireless power receiver based on a magnitude of the current induced in the first inductive coil by the first electromagnetic field,
determining, based on the determined distance, whether the first inductive coil and the wireless power transmitter are aligned, and
based on the determination whether the first inductive coil and the wireless power receiver are aligned, generating a second electromagnetic field via the first inductive coil for wireless power transfer to the wireless power receiver.

31. The method of claim 30, further comprising generating the second electromagnetic field to wirelessly transmit power to the wireless power receiver based on an indication of proximity to the wireless power receiver.

32. The method of claim 31, further comprising receiving a notification from the wireless power receiver, the notification notifying the wireless power transmitter before the first electromagnetic field is generated.

33. The method of claim 30, further comprising measuring a magnitude of the current.

34. The method of claim 30, further comprising transmitting the indication to the wireless power receiver.

35. The method of claim 30, further comprising continuously transmitting the indication to the wireless power receiver.

36. A wireless power receiver comprising:
means for receiving wireless power from a first electromagnetic field generated by a first wireless power transmitter;
means for detecting a presence of the first wireless power transmitter; and
means for generating a second electromagnetic field, in response to the detected presence of the first wireless power transmitter, that induces a current in the first wireless power transmitter or in a second wireless power transmitter, causing the first wireless power transmitter or the second wireless power transmitter to determine a distance between the means for generating a second electromagnetic field and the first wireless power transmitter or the second wireless power transmitter based on a magnitude of the current,
wherein the means for receiving wireless power receives power during wireless power transfer from the first wireless power transmitter via the first electromagnetic field generated by the first wireless power transmitter.

37. The wireless power receiver of claim 36, further comprising means for aligning the wireless power receiver with the wireless power transmitter based on the indication of the distance.

38. The wireless power receiver of claim 37, further comprising means for displaying the indication.

* * * * *